(12) United States Patent  
Orton et al.

(10) Patent No.: US 8,667,123 B2
(45) Date of Patent: Mar. 4, 2014

(54) MICROCONTROLLER NETWORK DIAGNOSTIC SYSTEM

(75) Inventors: Trevor Orton, Cambridge (CA); William Turnbull, Conestogo (CA); Sergei Kauzunovich, Manchester, NH (US)

(73) Assignee: Woodhead Industries, Inc., Lincolnshire, IL (US)

( * ) Notice: Subject to any disclaimer, the term of this patent is extended or adjusted under 35 U.S.C. 154(b) by 1109 days.

(21) Appl. No.: 12/505,178

(22) Filed: Jul. 17, 2009

(65) Prior Publication Data

US 2010/0082805 A1 Apr. 1, 2010

Related U.S. Application Data

(60) Provisional application No. 61/101,059, filed on Sep. 29, 2008.

(51) Int. Cl.
*G06F 13/00* (2006.01)

(52) U.S. Cl.
USPC ............ 709/224; 709/232; 709/236; 370/242

(58) Field of Classification Search
USPC ................ 709/223, 224, 230, 232, 236, 250; 370/242
See application file for complete search history.

(56) References Cited

U.S. PATENT DOCUMENTS

| | | |
|---|---|---|
| 4,590,556 A | 5/1986 | Berger et al. |
| 4,620,118 A | 10/1986 | Barber |
| 4,679,166 A | 7/1987 | Berger et al. |
| 5,828,578 A | 10/1998 | Blomgren |
| 5,832,294 A | 11/1998 | Reinschmidt |
| 5,941,966 A | 8/1999 | Gotze et al. |
| 7,089,089 B2 * | 8/2006 | Cumming et al. ............ 700/295 |
| 7,345,428 B2 * | 3/2008 | Turner ..................... 315/111.21 |
| 7,362,714 B2 * | 4/2008 | Richardson et al. .......... 370/242 |
| 7,855,952 B2 * | 12/2010 | Yang et al. .................... 370/218 |
| 2008/0181123 A1 * | 7/2008 | Huang et al. .................. 370/252 |
| 2008/0320280 A1 | 12/2008 | Blixt |

OTHER PUBLICATIONS

Product Brochure entitled eNetMeter™ for DeviceNet by Brad® from Molex (Sep. 2008), pp. 1-2.

* cited by examiner

*Primary Examiner* — Viet Vu
(74) *Attorney, Agent, or Firm* — Larry I. Golden

(57) ABSTRACT

A network diagnostic device is provided, which comprises a passive real-time measurement tool that is useful for, among other things, expediting fault identification, isolation, and repair of a communication network or bus. The device also facilitates prediction of failures by identifying marginal operating conditions. The device analyzes data flowing through the communication network, including through an analysis of variations in bit waveform shape carried by the network physical interconnect media. In one embodiment, an implementation of the network diagnostic device is particularly useful in a DeviceNet-compatible network or, more generally, a Controller Area Network (CAN). The device identifies faults by comparing measurements made on the actual DeviceNet bus with worst-case acceptable criteria. The device interfaces with a remote monitoring computer via an Ethernet compatible medium to display parsed bit-level waveforms, network warnings and errors, as well as an overall network health index.

37 Claims, 16 Drawing Sheets

MICROCONTROLLER NETWORK DIAGNOSTIC SYSTEM

CROSS-REFERENCE TO RELATED APPLICATIONS

This patent application claims the benefit of U.S. Provisional Patent Application No. 61/101,059 filed Sep. 29, 2008, which is incorporated herein by reference in its entirety, including without limitation all drawings and figures therein.

FIELD OF THE INVENTION

This invention relates generally to the field of industrial networks and more specifically to controller area network diagnostic systems.

BACKGROUND OF THE INVENTION

Digital communication signals have international standards that define minimum signal thresholds for a binary one, or a high condition, and maximum signal thresholds for a binary zero, or a low condition. A standard for a particular type of communication signal typically also defines a transition time and/or voltage threshold as a reference, and specifies a time delay after the transition event during which to measure the data voltage in order to determine the validity of a particular bit. Therefore, if the signal level is lower than the high threshold or higher than the low threshold at this specified time, then the bit is not considered valid. Invalid bit transmissions increase network error rates, drive up maintenance costs, and may result in down time for the devices connected to the network or signal bus.

Minimizing or eliminating down time for the connected devices is especially important for Controller Area-based Networks (CAN), such as those based on the DeviceNet communication protocol, which may be employed in the context of an automated production line. DeviceNet industrial networks use the CAN interface as the backbone for a differential serial bus for bit communications and add a custom application layer. DeviceNet is defined by the Open DeviceNet Vendor Association standards and by International Standards Organization standard number ISO 11898. Typical devices interconnected via a CAN signal bus in a DeviceNet network include photo/optical sensors, proximity sensors, switches, as well as various other sensors and control units.

Existing DeviceNet network diagnostic devices have limited processing power and, therefore, typically collect only frame-level diagnostic information for storage in local memory. Such devices must be taken off-line in order to download data collected over time in the internal memory for further analysis. This prevents real-time analysis and network fault prediction since these devices do not interface with external networks and must first collect sufficient data prior to making it available (e.g., via a USB port connection). Furthermore, collection of frame-level information does not provide sufficient detail for waveform analysis that is needed to validate bit-level transmissions from particular network nodes.

BRIEF SUMMARY OF THE INVENTION

A network diagnostic device according to the following description (the "device") is a passive real-time measurement tool that is useful for, among other things, expediting fault identification, isolation, and repair of a communication network or bus. The network diagnostic device also facilitates prediction of failures by identifying marginal operating conditions. A communication network interconnects multiple nodes that send or receive digital data for communication between nodes, with each node having its own address. The device analyzes data flowing through the communication network, including through an analysis of variations in bit waveform shape carried by the network physical interconnect media.

In one embodiment, an implementation of the network diagnostic device is particularly useful in a DeviceNet-compatible network or, more generically, a Controller Area Network (CAN). In accordance with the teachings of this specification, the device may be further extended to a variety of packet switched data networks, including Ethernet-based networks. The network diagnostic device identifies faults by comparing measurements made on the actual DeviceNet bus with worst-case acceptable criteria established by the DeviceNet specification. The acceptable criteria used to identify faults can also be adjusted by the user in order to meet the needs of a particular network.

In a highly preferred embodiment, the network diagnostic device connects to a DeviceNet network and to an Ethernet-based network. Through the Ethernet capability, the device communicates with a remote monitoring computer system, whereby one or more applications running on the remote monitoring computer can obtain measurement data and/or configure the network diagnostic device. In addition, the device may communicate with one or more EtherNet/IP masters, whereby each master can obtain measurement data and/or configure the network diagnostic device.

The network diagnostic device measures a plurality of waveform parameters, such as power (V+), shield, CAN High, and CAN Low line voltage waveforms, on a DeviceNet network. It further analyzes the shape of the data signal and decodes the data protocol to comprehensively characterize the operational health of a DeviceNet installation. A standard 5-pin micro connector is used to connect the network diagnostic device to the DeviceNet network. The network diagnostic device makes several different physical measurements and mathematically calculates or infers other measurements. Actual measurements include the current, minimum, and maximum values for a plurality of waveform parameters associated with power, shield, CAN High, and CAN Low signals, as well as readings of node address, bit rate, error rate, error counts, message rate, and bandwidth utilization on node, source, and network levels. Inferred measurements include the current, minimum, and maximum values for a plurality of CAN Differential waveform parameters, as well as CAN High and CAN Low common mode voltage on node, source, and network levels.

The network diagnostic device compares these actual operating conditions to a set of threshold limits to determine network health. Each DeviceNet node generates digital data on the bus and physically interconnects to all other nodes at all times, therefore each node can produce a failure source for the entire network. Therefore, to certify proper operating conditions for the entire network, the network diagnostic device measures and verifies performance conditions of each node, which results in thousands of measurements based on the number of nodes and the number of corresponding parameters measurements.

To provide various levels of analysis detail, the network diagnostic device offers two modes of operation: (1) an Individual Measurement Mode, and (2) a Network Health Mode. The Individual Measurement Mode allows an advanced user to inspect the specific parameter measurement value for a specific node, source, or the overall network. The Network Health Mode simplifies troubleshooting of a DeviceNet installation by condensing the results of all measurements into a single overall network health status. The status is provided via a set of three values that represent the fault and warning health state for the power, shield, signal (i.e., CAN High, Low, Differential), and traffic measurement data. The network health status allows a user to immediately interpret the status of the entire network, even if its implementation architecture is complex. The status indicates whether all network parameters are within the defined fault and warning threshold limits (i.e., the network is operating within the desired parameter range), that one or more operating parameters exceed the defined warning threshold limits (i.e., the network is marginal), or that one or more critical parameters exceed the defined fault threshold limits (i.e., the network is unacceptable). If the user wants more information, they can then obtain summary measurement information or individual measurement values as required.

Preferably, the network diagnostic device offers multiple methods to obtain the measurement data: (1) directly, using an EtherNet/IP master to communicate with the network diagnostic device as if it were a typical slave device on an EtherNet/IP network, (2) visually, using the network diagnostic device application software, (3) programmatically, using the network diagnostic device's API DLL, and (4) via an OPC Data Access Client, using the network diagnostic device OPC Data Access OPC Server.

In a system with many performance parameters, the network diagnostic device directs the user to the specific fault sources. Directing the user to potential causes of network problems significantly reduces the time required to isolate the problem. The network diagnostic device continuously and repeatedly gathers a number of different measurements for all network nodes. The network diagnostic device software reduces the time to repair a DeviceNet network by allowing the user to potentially monitor dozens of networks at the same time, and when a network problem is indicated, to reposition the display such that only the measurements that are beyond the specified warning or fault threshold limits are shown. In a typical installation, this filtration could reduce the number of measurements that the user needs to review from several hundred, or even several thousand, to only a few.

The network diagnostic device updates a current, minimum, and maximum value buffer for every measurement type for every node (address) after each new acquisition. The user can view the real-time updates for a particular measurement and compare the average real time values to the maximum and minimum values to determine the distribution, which can be used to indicate different failure mechanisms. For example, if the average-to-minimum and average-to-maximum ratios are similar, then the variation represented by the difference between the average measurements to either the maximum or the minimum is likely due to random noise. However if the average values are close to the minimum value and far from the maximum value, then the system likely has an intermittent fault.

The performance testing system contained within the network diagnostic device includes a real-time data measurement system and a signal analysis system. The real-time measurement system quantitatively and consistently determines data validity. The signal analysis system then analyzes the signal by comparing this digital numeric representation of the signal level to a reference level defined by the DeviceNet standard. The same approach measures signal attenuation. Signal attenuation is determined by measuring the actual signal level at the specified time for both a High signal and a Low signal. If both the High and the Low are too low in voltage, then the signal has been attenuated above permissible levels. Likewise, the common mode voltage (CMV) is determined by measuring the actual signal level at the specified time for both a High signal and a Low signal. If both the High and the Low are too high in voltage, then the signal has excessive CMV.

The network diagnostic device uses a unique method of emulating a DeviceNet transceiver for the purpose of (1) determining whether a DeviceNet network under test produces signals within specification limits for each node, (2) determining whether a DeviceNet network under test has power and shield voltages within the specification limits, and (3) accurately measuring bus signal levels, attenuation, rise/fall time, overshoot/undershoot voltage, and common mode voltage. Preferably, all bits within the data and CRC fields of each CAN frame are analyzed by the network diagnostic device.

To facilitate real-time processing of bit-level waveform parameters, the network diagnostic device uses high speed analog-to-digital converters (ADC), for example operating at 100 Mbps, and custom circuits to analyze data every 10 ns. Furthermore, two microprocessors are employed to further analyze, buffer, and deliver results to the user. Preferably, the first microprocessor is involved in bit-level waveform parameter analysis and is implemented via a Field-Programmable Gate Array (FPGA) circuit. In a highly preferred embodiment, the first microprocessor conforms to the NIOS embedded processor specification. The second microprocessor obtains the data from shared memory and relays it to a remote monitoring computer system via an Ethernet-based network. Preferably, the second microprocessor employs the ARM processor architecture. In an embodiment, a shared RAM controller arbitrates access to shared memory between the two microprocessors on a first-come-first-served basis.

In one aspect of the invention, a method is provided for analyzing network signals originating from a network node, the method comprising (a) receiving a network frame, the network frame having a predetermined format and comprising a plurality of bits, each bit represented by a waveform signal, (b) parsing each bit within the network frame, (c) evaluating one or more predetermined parameters for the waveform signal representing each bit, (d) transferring the one or more predetermined parameters to a computer readable medium, and (e) comparing each measured parameter to a corresponding set of thresholds, the set of thresholds for each parameter representing one or more of a network error and a network warning.

In another aspect of the invention, a system is provided for analyzing network signals originating from a network node, the system comprising (a) a network diagnostic device adapted for receiving a network frame via a first type of network interface, the network frame having a predetermined format and comprising a plurality of bits, each bit represented by a waveform signal, the network diagnostic device parsing at least one bit within the network frame and evaluating one or more predetermined parameters of the waveform signal representing the at least one parsed bit to determine one or more of a network error and a network warning, and (b) a remote monitoring computer adapted for receiving at least one of the one or more evaluated parameters and the network warnings and errors from the network diagnostic device via a second type of network interface.

In yet another aspect of the invention, a network diagnostic device is provided for analyzing network signals originating from a network node, the network diagnostic device comprising (a) a first type of network interface for receiving a network frame having a predetermined format in accordance with a first network communication standard, the network frame comprising a plurality of bits, each bit represented by a waveform signal, (b) circuitry for evaluating one or more predetermined parameters of the waveform signal representing at least one of the plurality of bits, the circuitry further comprising a first microprocessor for comparing each evaluated parameter to a corresponding set of thresholds, the set of thresholds for each parameter representing one or more of a network error and a network warning, and (c) a second microprocessor for communicating at least one of the one or more evaluated parameters, the network warning, and the network error to a remote monitoring computer via a second type of network interface in accordance with a second network communication standard.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
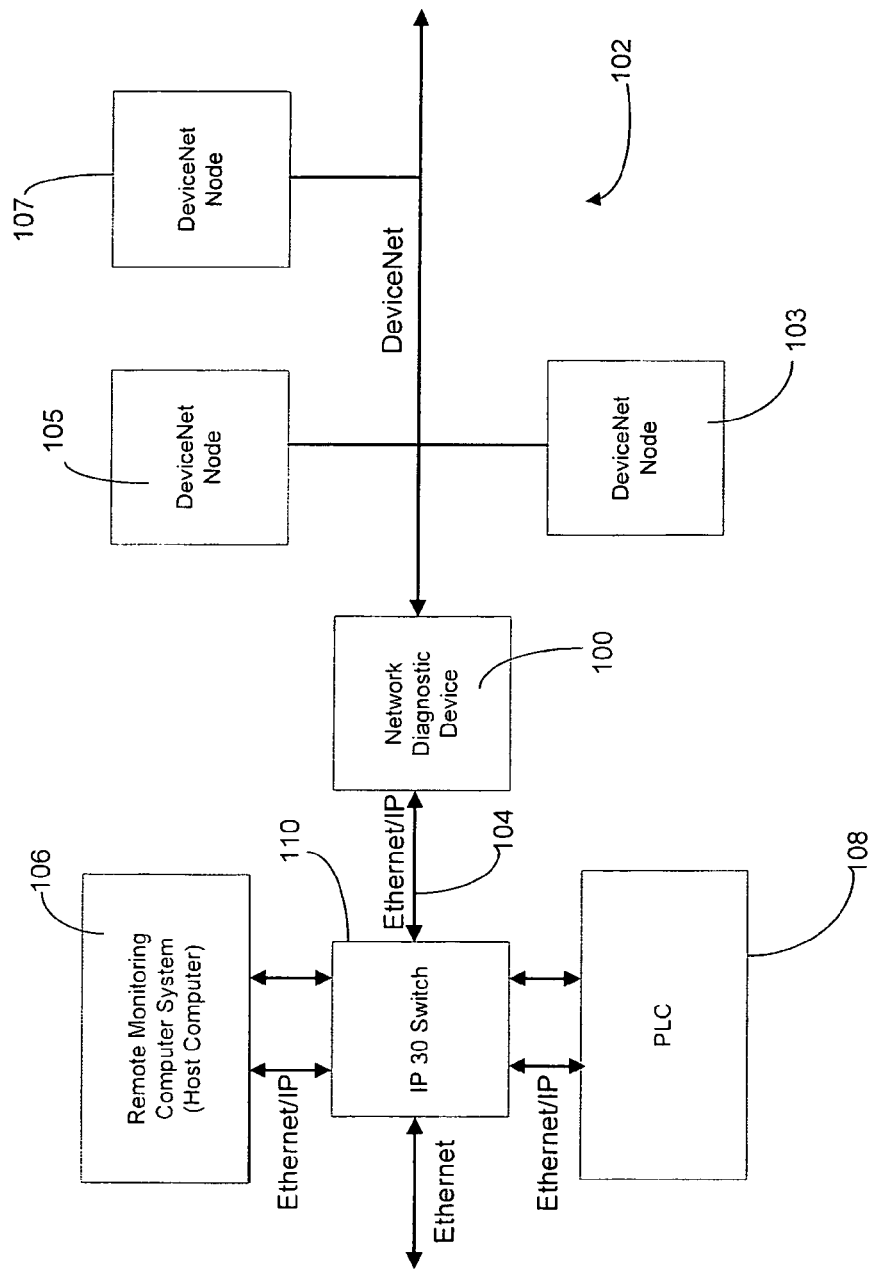
FIG. 1 is a schematic diagram illustrating an embodiment of a network environment including a network diagnostic device for monitoring signal-level status of a Controller Area Network (CAN)-based network, such as a DeviceNet network.

Turning to FIG. 1, an embodiment of a network environment including a network diagnostic device for monitoring signal-level status of a Controller Area Network (CAN)-based network, such as a DeviceNet network, is shown. Although the following description provides an exemplary embodiment for monitoring signal-level (or bit-level) status of a DeviceNet network, those skilled in the art will appreciate that the following description is applicable to diagnosing the status of CAN-based networks in general, as well as other networks operating in accordance with a predetermined network specification, including Ethernet-based networks.

The network diagnostic device 100 is a passive device that continuously monitors a plurality of bit-level waveform parameters associated with a DeviceNet network 102, including the data transmitted by a plurality of DeviceNet nodes 103, 105, 107, and communicates the monitored information over an Ethernet medium connection 104 to a computer monitoring system 106. Alternatively or in addition, the diagnostic device 100 communicates the monitored information to a Programmable Logic Controller (PLC) 108. In one embodiment, the diagnostic device 100 communicates the monitored information through an Ethernet switch 110 for combining input from multiple diagnostic devices 100, wherein each diagnostic device 100 monitors a predefined subset of the overall DeviceNet network 102. In embodiments, the information relayed by the network diagnostic device 100 is accessible at the computer workstation 106 and/or PLC 108 via one or more of a custom software interface, a dynamically linked library (DLL), and an OLE for Process Control (OPC) server interface.

The network diagnostic device 100 employs high-speed sampling of DeviceNet network data transmitted by one or more DeviceNet network nodes 103, 105, 107 (such as controllers) to accurately measure a plurality of signal-level parameters associated with transmitted network data. In an embodiment, the network diagnostic device 100 also provides feedback of sampled network data to an Ethernet Industrial Protocol (EtherNet/IP™) master over an Ethernet medium 104. By comparing acceptable baseline measurements of "healthy" network signal parameters, the network diagnostic device 100, in conjunction with the monitoring computer workstation 106, allows prediction of imminent network failures down to individual devices (network nodes 103, 105, 107). Network signal parameters falling outside of acceptable tolerances result in warning and/or fault flags being presented to the user for immediate action with respect to a specific network node or network location responsible for the warning or fault. The software interface at the workstation 106 provides for customization of warning and fault tolerances for a given signal parameter monitored by the network diagnostic device 100. Preferably, the workstation 106 stores signal-level network data collected by the network diagnostic device 100 to compile a DeviceNet network "health index."

Figure 2:
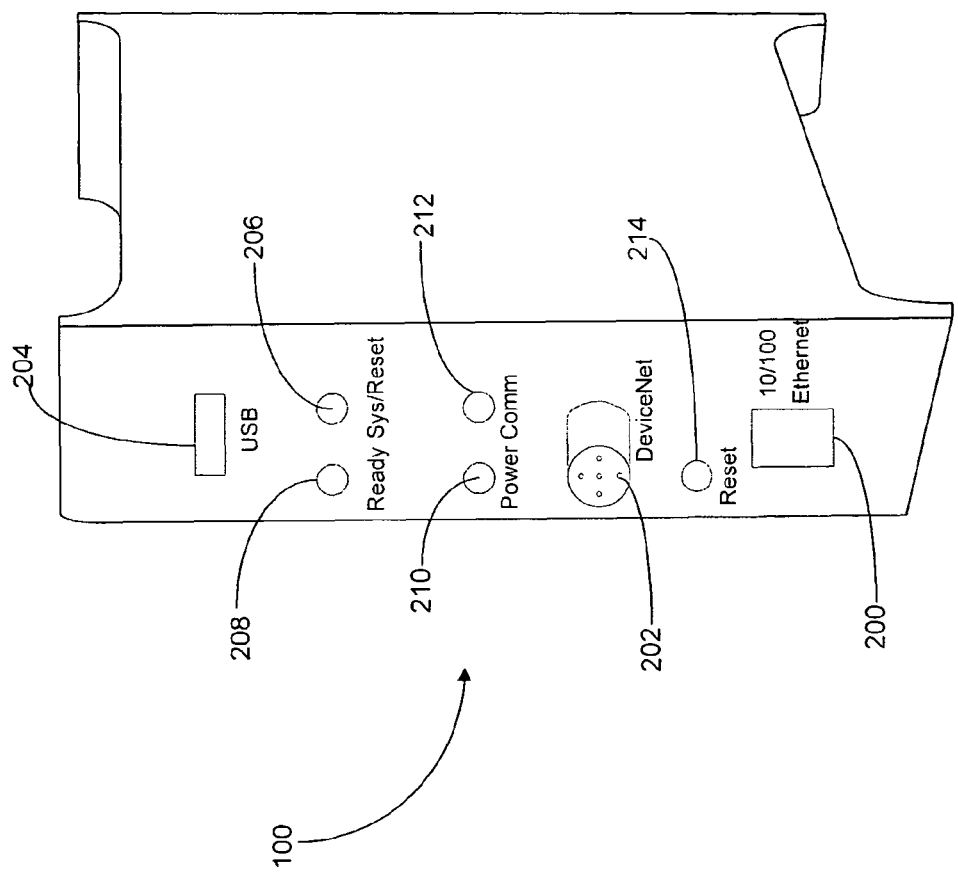
FIG. 2 is a schematic diagram illustrating an embodiment of a network diagnostic device of FIG. 1.

An embodiment of the network diagnostic device 100, including its external ports and status LEDs, is illustrated in FIG. 2. The device 100 includes an Ethernet port 200 for communicating with Ethernet/IP master over an Ethernet medium. To connect to the DeviceNet side of the network, the device 100 includes a standard five pin DeviceNet port 202. A USB port 204 provides for a connection to an external USB flash memory mass storage drive, for example in order to save time stamped information to the USB drive while operating via a backup power source (e.g., an internal super storage capacitor) during a power failure. "Sys/Reset" and "Ready" LEDs 206, 208 respectively indicate when the device 100 is in the process of booting up its internal firmware and when it is ready for normal operation. DeviceNet status LEDs 210, 212 indicate presence of power and data signals, respectively, for the DeviceNet network input via the DeviceNet connector 202. Finally, a "Reset" button 214 provides for a hard reset of firmware and/or software operating in the internal memory of the device 100.

Figure 3:
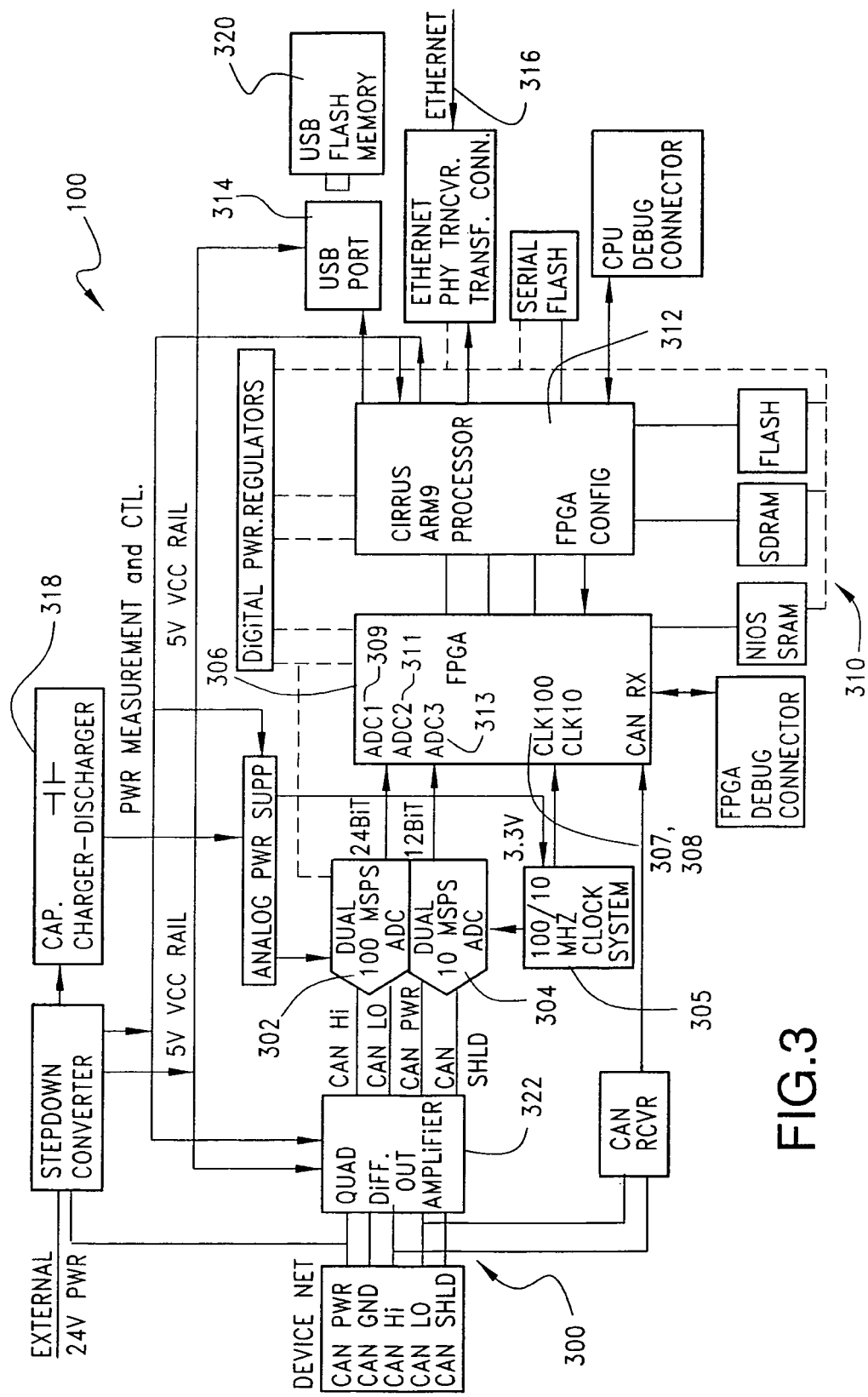
FIG. 3 is a schematic diagram of internal hardware component architecture of the network diagnostic device, in accordance with an embodiment of the invention.

Turning to FIG. 3, an internal hardware component diagram of an embodiment of the network diagnostic device 100 is shown. The hardware components of the network diagnostic device 100 capture the network signals in a non-pervasive manner in order to analyze the captured data and communicate the results of the analysis to a host system. An analog front end 300 digitizes the CAN_H (CAN High), CAN_L (CAN Low), CAN Power, and CAN Shield signals via analog-to-digital (ADC) converters 302-304 and feeds the digitized signals to a Field-Programmable Gate Array (FPGA) 306. The ADC converters 302-304 have a high sampling rate and bit resolution. In an embodiment, the ADCs 302-304 respectively provide a 100M and 100M samples per second sampling rates with a 12 bit resolution. The FPGA 306 includes dual ports, ADC1 and ADC2 for receiving digitized CAN High and CAN Low signals from the ADC 302, as well as a single ADC3 port for receiving a digitized Power/Shield signal from the ADC 304. The diagnostic device 100 further comprises a low jitter clock 305. The FPGA 306 includes a CAN transceiver 307 that processes bit-level waveform data for a single CAN packet at a time and feeds the new data to an internally implemented microprocessor 308 that conforms to the NIOS embedded processor architecture. The NIOS microprocessor 308, implemented via the FPGA 306, further processes all single channel data into a signal table that includes all 64 DeviceNet nodes.

The NIOS microprocessor 308 measures a plurality of waveform parameters for a given bit within a captured CAN packet corresponding to a particular node of a DeviceNet network. For instance, the NIOS microprocessor 308 measures a plurality of waveform parameters associated with Power (V+), Shield, CAN High, and CAN Low line voltage waveforms. The NIOS microprocessor 308 analyzes the shape of the data signal to comprehensively characterize the operational health of a DeviceNet installation. The NIOS microprocessor 308 makes several different physical measurements on the captured bit-level waveform and mathematically calculates or infers other measurements. The NIOS microprocessor 308 compares the actual operating conditions to a set of threshold limits to determine network health. In embodiments, the threshold limits are defined by the DeviceNet specification and/or by the user.

To communicate the analysis and the captured network signals to an external host system, the NIOS microprocessor 308 writes the analysis results and captured network signal data to RAM memory 310 shared with an ARM microprocessor 312 that pulls the copied data for further processing. In one embodiment, the ARM microprocessor 312 uses a Windows CE operating system to manage a USB port 314 and an Ethernet port 316. The host system retrieves the analysis results and the captured network signal data via the Ethernet port 316 using the Ethernet/IP protocol, for example.

Preferably, the diagnostic device 100 includes an internal super capacitor energy storage element 318, which provides approximately 3 seconds of functionality time after a power loss, thereby allowing the diagnostic device 100 to save time stamped information on an external USB mass storage device 320. In one embodiment, the diagnostic device 100 is powered via CAN network power signal (CAN PWR/GND). Alternatively or in addition, the diagnostic device 100 is powered via an external power input.

Figure 4:
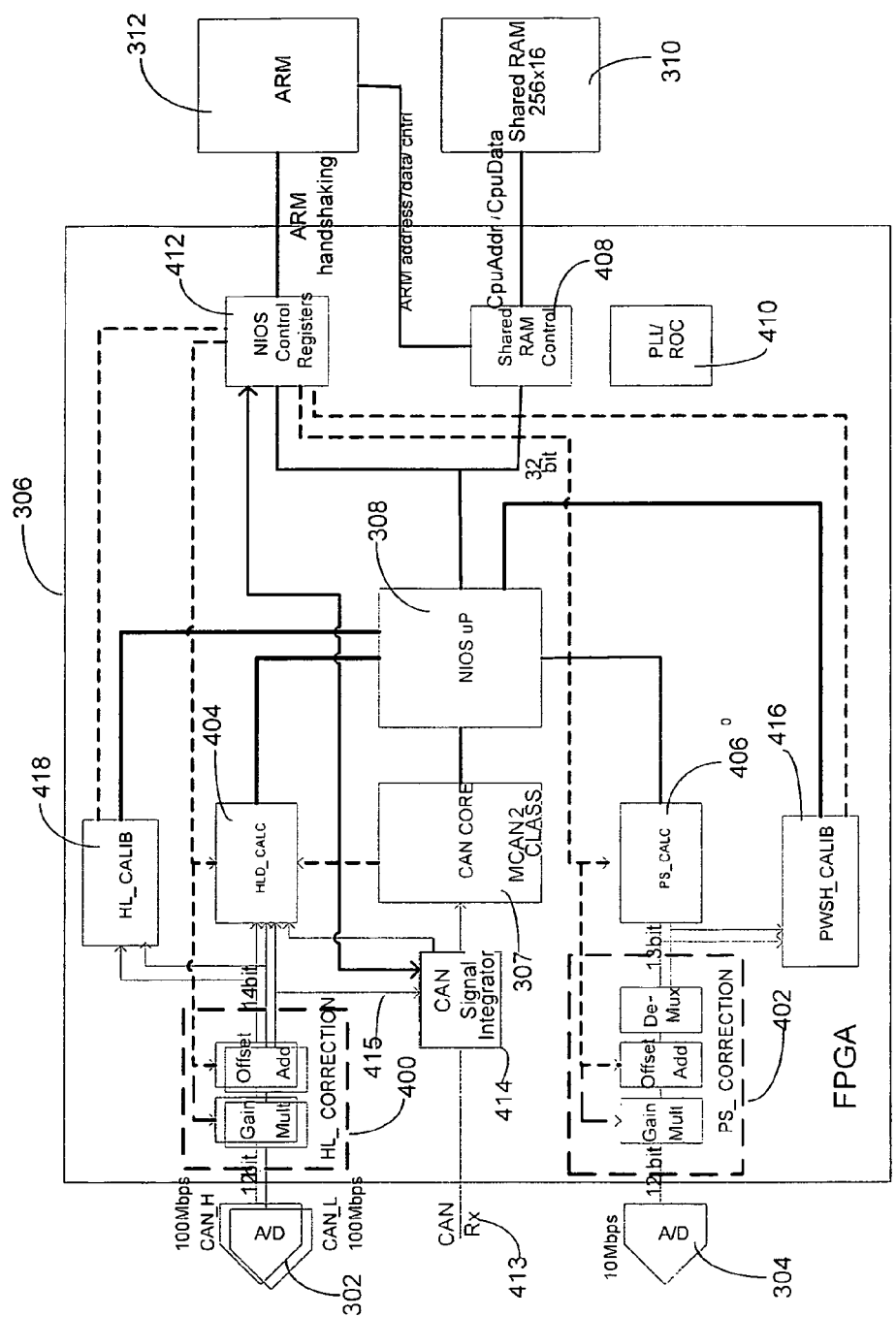
FIG. 4 is a schematic diagram of a Field-Programmable Gate Array (FPGA) structure of the network diagnostic device, in accordance with an embodiment of the invention.

Referring to FIG. 4, an embodiment of the FPGA 306 is shown in more detail. The FPGA 306 provides the following: (a) corrects for input amplifier and ADC 302, 304 measurement errors, (b) measures, analyzes and reports non-CAN signal specific parameters (power and shield-related waveform parameters discussed in connection with Table 1 below), and (c) measures, analyzes and reports CAN signal specific parameters (CAN_H, CAN_L, and CAN_D-related waveform parameters discussed in more detail in connection with FIGS. 9 and 9a, as well as Table 2, below).

Non-CAN signal specific measurements, such as power and shield, are triggered by the NIOS microprocessor 308. During each measurement block, the signal analysis for power and shield results in measurement of the waveform parameters shown in Table 1 below, which are saved to memory. Preferably, the duration of the measurement block is 512 samples@10 Msps multiplexed, which is 1.024 ms.

TABLE 1

Power and Shield Parameters

| Parameter | Description |
|---|---|
| Shield/Power V Array | The shield/power voltage array contains 512 values at 5 Msps (10 Msps multiplexed) so each sample is 200 ns apart. Each 32-bit value contains the shield voltage as the upper 16-bit value and the power voltage as the lower 16-bit value. |
| Power V Avg | Average power voltage |
| Shield V Avg | Average shield voltage |
| Power V Max | Maximum single data point power voltage |
| Shield V Max | Maximum single data point shield voltage |
| Power V Min | Minimum single data point power voltage |
| Shield V Min | Minimum single data point shield voltage |
| Power $RMS^2$ V | Power RMS noise squared. NIOS takes the square root to obtain RMS. |
| Shield $RMS^2$ V | Shield RMS noise squared. NIOS takes the square root to obtain RMS. |

Additional features of the FPGA 306 are discussed in more detail below.

Incoming Data Sampling and Calculation

In an embodiment, incoming CAN_H, CAN_L, Power, and Shield signals are sampled at the rate of 100 MHz from the ADC 302, 304. HL_Correction and PS_Correction blocks 400, 402 perform correction on incoming data by compensating for the tolerances generated by front end amplifiers 322 (FIG. 3) of the network diagnostic device 100. Corrected data is used to create a CAN_D (CAN Differential) signal and a CAN RX signal which the CAN core 307 uses to detect the CAN frames. Power, Shield, CAN High, CAN Low and differential data are then stored in an internal memory. Using the sampled data, the HLD_CALC block 404 calculates rise and fall times of the CAN bit edges, as well as minimum, maximum and average voltages and RMS noise, and stores the calculated values in a set of registers. The NIOS microprocessor 308 reads these values from the set of registers and stores them in the shared RAM 310. Similarly, using the sampled data, the PS_CALC block 406 calculates Power and Shield minimum, maximum, and average voltages, as well as RMS noise, and stores the calculated Power and Shield values into a set of registers that the NIOS microprocessor 308 reads from in order to store these values in the shared RAM 310.

NIOS Processor

After setting up the connection to the CAN network to facilitate bit-level waveform parameter as well as network warning and error measurements and calculations, the NIOS processor 308 reads the calculated or measured data and passes it on to the ARM processor 312 via the shared RAM 310. Among other data, the NIOS processor 308 reads the CAN-related bit waveform parameters, such as signal data averages, rise/fall times, minimums and maximums, and collates the data into tables stored at the shared RAM 310. The data stored at the shared RAM 310 is available to the external ARM processor 312 that subsequently transmits it to the user. Calibration data is read by the NIOS 308 and made available to the user without additional processing.

Preferably, the NIOS microprocessor 308 is implemented within the FPGA 306. In an embodiment, the NIOS processor 308 runs at 50 Mhz, executes from an external Shared RAM 310, and uses 2K of instruction cache, as well as 1K of data cache (FPGA Memory), to improve processing speed. An interrupt table is stored in the Shared RAM 310 and copied by firmware into the "NIOSBOOT" memory, which, in one embodiment, is a block of 8K bytes of on-chip memory. The NIOS processor 308 reads the measured and calculated data from the CAN High, Low and Differential sub-module registers and outputs them to the shared RAM 310. The NIOS processor 308 also reads the measured and calculated data from the power/shield registers within the PS_CALC module 406 and then stores it into the shared RAM 310. The NIOS processor 308 accesses a set of registers that control the following functionality: handshaking with the ARM processor 312, calibration mode and normal mode of the device 100, IRQ control, LED color and derivation of signal values necessary for correction of CAN_H, CAN_L, Power, and Shield signals. The NIOS processor 308 also controls the online/offline state of the CAN core 307. In one embodiment, the CAN core 307 is a MENTOR MCAN2 class core.

Shared Memory Access

Figure 4A:
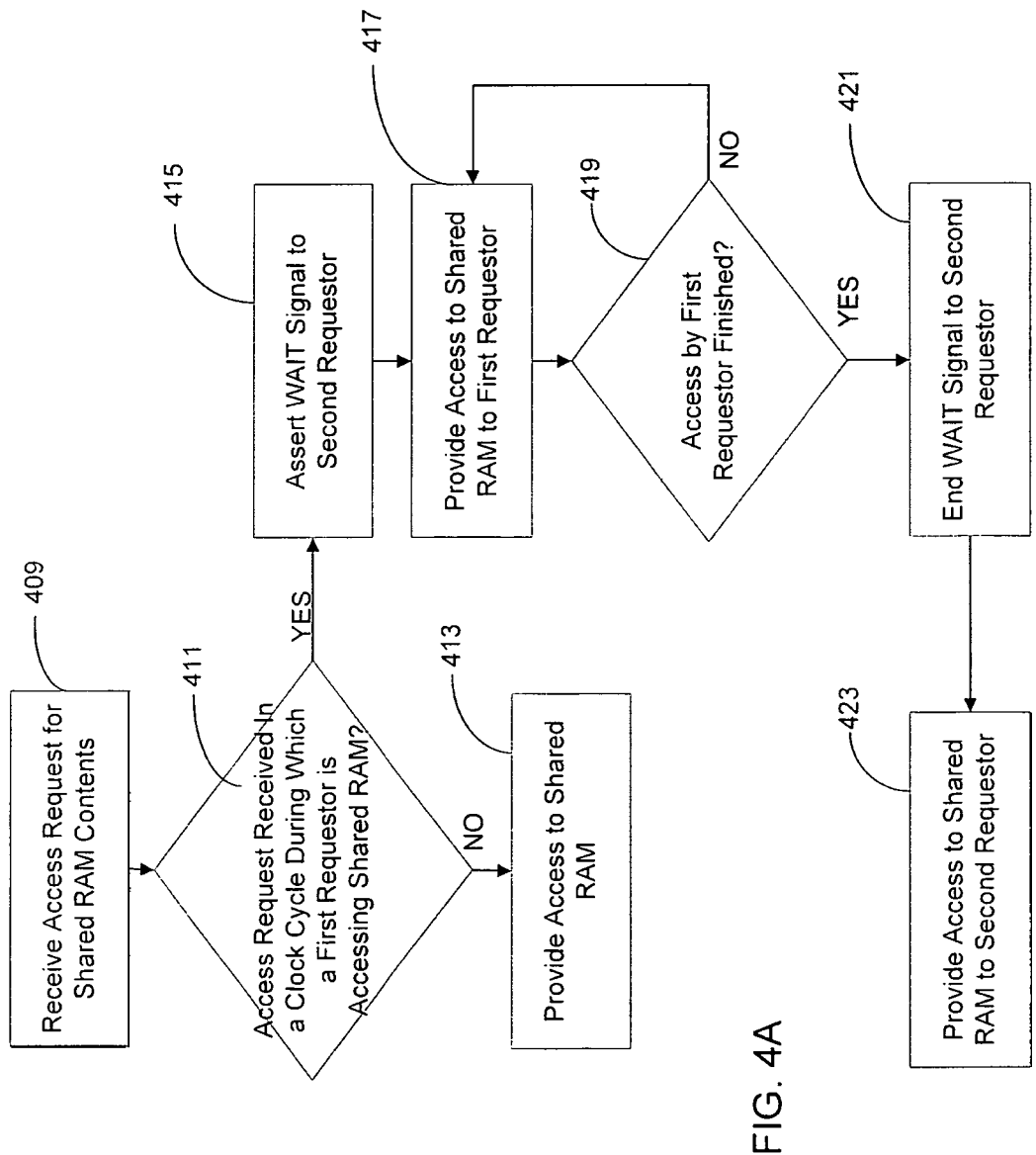
FIG. 4A is a flow chart of a method for controlling access to shared memory of the network diagnostic device, in accordance with an embodiment of the invention.

The FPGA 306 provides controlled access to the shared memory 310 for the internally implemented NIOS processor 308 and the external ARM processor 312. The shared RAM controller 408 arbitrates access to shared RAM memory 310 by the NIOS processor 308 and ARM processor 312. For instance, when NIOS 308 accesses the shared external RAM 310, the ARM processor 312 is instructed to wait until the NIOS processor 308 is finished accessing the shared RAM 310. Likewise, when the ARM processor 312 accesses the external RAM 310, the NIOS processor 308 is instructed to wait. Thus, the RAM controller 408 prevents concurrent access to shared RAM 310 by both NIOS and ARM processors in order to avoid causing any bus contention between the two processors. As illustrated in FIG. 4A, access to shared RAM 310 is provided on a first-come-first-served basis. In steps 409-417, when one of the two microprocessors 308, 312 requests access to the external RAM 310 in a clock cycle during which the other microprocessor is already in process of accessing the external RAM 310, the shared RAM controller 408 prioritizes the request times and postpones access for the processor that was second to request access during a given clock cycle (i.e., the second requester). While the first requesting processor is accessing the shared RAM in step 417, the second requesting processor is held off by asserting its WAIT signal until the first requesting processor is finished with its access, steps 419-423. In the event of simultaneous access requests from both processors during the same clock cycle, the processor that had last access to the shared RAM is assigned the lowest priority for the next access. The shared RAM controller 408 accepts inputs from ARM and NIOS address and data buses, including read, write and control signals from the processors 308, 312. Preferably, such control signals as read, write and chip selects from the ARM processor 312 are double registered for synchronization and metastability hardening.

Figure 4B:
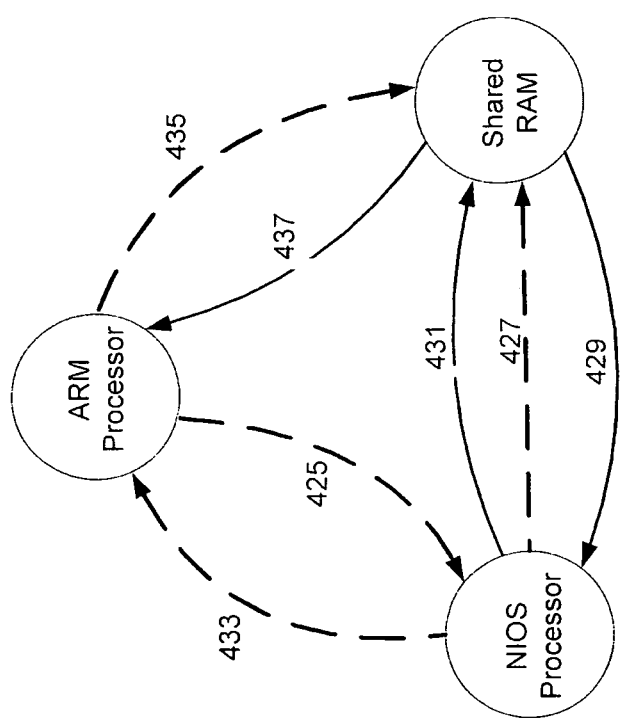
FIG. 4B is a diagram of an interrupt routine in connection with controlling access to shared memory of the network diagnostic device, in accordance with an embodiment of the invention.

The network diagnostic device 100 implements the shared RAM memory access via an embodiment of an interrupt routine illustrated in FIG. 4B. In step 425, the ARM processor 312 issues an interrupt to the NIOS processor 308. In step 427, the NIOS processor 308 reads an interrupt table from the shared RAM 310. In steps 429-433, the NIOS processor 308 gets the interrupt table back from Shared RAM 310, writes the data to shared RAM 310, and issues an interrupt acknowledgement to the ARM processor 312. In steps 435-437, the ARM processor reads and gets back the data from the Shared RAM 310.

CAN Signal Filtering

The FPGA 306 filters incoming CAN signals (CAN_H/CAN_L) in order to generate a CAN_RX signal for both the CAN core 307 and HLD_CALC module 404. In one embodiment, the FPGA 306 also accepts an external incoming CAN_RX signal directly through the CAN interface and routes it to the CAN core module 307.

CAN Detection

Figure 5:
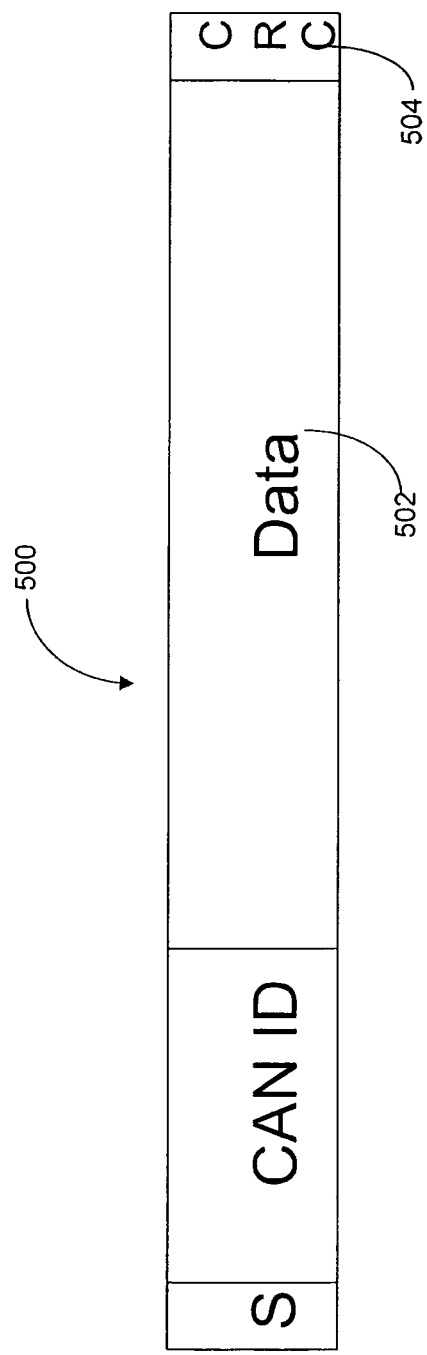
FIG. 5 is a schematic diagram of a Controller Area Network (CAN) compatible frame format, in accordance with an embodiment of the invention.

The FPGA 306 captures CAN network frame data. In an embodiment, the CAN core 307 operates at 25 MHz and stores the received CAN frame data, which is then read by the NIOS microprocessor 308. The CAN core 307 also identifies the data and CRC portions 502, 504 of the CAN frame 500 (shown in FIG. 5). The CAN core 307 generates a signal that is set to "1" when the CAN core state machine detects that the current frame being sent on the CAN bus is in its data or CRC portions.

The CAN core interfaces with four (4) modules. The PLL/ROC module 410 provides the CAN core 307 with the reset, 50 Mhz and 25 Mhz clocks. The HLD_CALC module 404 receives a "Data_or_CRC" signal from the CAN core 307 to cause the HLD_CALC module 404 to begin CAN-signal related waveform calculations. The third interface is the CAN signal integrator module 414, which provides the CAN network bit stream to allow the CAN core 307 to decipher the CAN network traffic data. Finally, the CAN core 307 provides the NIOS processor 308 with all CAN-related information, including the frame data, node data, and CAN error data.

Clocking and Reset

There are two external clock inputs 305 (FIG. 3) to the FPGA 306: CLK_100 and CLK10. CLK_100 provides the input clock for the internal PLL, and CLK10 is used to generate a sampling signal for power and shield sampling. The FPGA 306 further includes an external reset signal for the ARM processor 312. The FPGA 306 resets the NIOS processor 308 through an internal PLL/ROC module 410. All reset signals to all sub-modules in the FPGA 306 are asynchronous resets. This allows all sub-modules to be put into a reset state if the PLL/ROC module 410 loses its lock, or the clocks suddenly stop working.

Modes of Operation

The FPGA 306 is capable of two modes of operation: a normal mode and a calibration mode. In the normal mode, the FPGA 306 tracks CAN data, power and shield signals on an ongoing basis. In calibration mode, the FPGA 306 collects only a finite number of signal samples and stores this information into the internal FPGA memory. In an embodiment, while in the calibration mode, the FPGA 306 stores 1024 samples for CAN high (CAN_H) and low (CAN_L) signals and 512 samples for power and shield signals.

HL_CORRECTION Module

Referring to FIG. 4, the HL_Correction module 400 latches the ADC values coming into the FPGA 306 on the CAN High and CAN Low lines and uses an AC gain and DC offset value to normalize the data in order to take into account natural drift and tolerances of the electronic components of the front end detection circuits of the product and PCB traces. For instance, 0V on the CAN signal is corrected to an ADC value that represents a 0V level. The gain and offset correction values come from the NIOS control registers module 412 and are written there from calibration data sent to the NIOS processor 308 during boot. ADC1 port 309 corresponds to the CAN Low input to the FPGA 306 and ADC2 port 311 corresponds to the CAN High input to the FPGA 306 (FIG. 3). In one embodiment, the gain and offset values correspond to a predetermined hexadecimal value that represents a real voltage of 0V from the power and shield signals. This allows calculation of purely unsigned values. The FPGA firmware converts these values back to a signed voltage in its ADC conversion calculations.

The sample rate of the ADC 302 is 100M samples per second with a resolution of 12 bits. A predetermined range of hexadecimal ADC values represents a real voltage range of −8V to 12V of the incoming CAN signal. This data is inverted inside the FPGA 306 to "flip" the data so that the smallest number represents the smallest voltage. In order to arrive at a normalized ADC value, the incoming ADC values are latched twice, inverted (since the ADC sends an inverted value), multiplied by the gain correction factor and added to the offset correction value. The output of the HL_Correction module 400 is connected to HLD_CALC module 404 and CAN Signal Integrator module 414.

Figure 6:
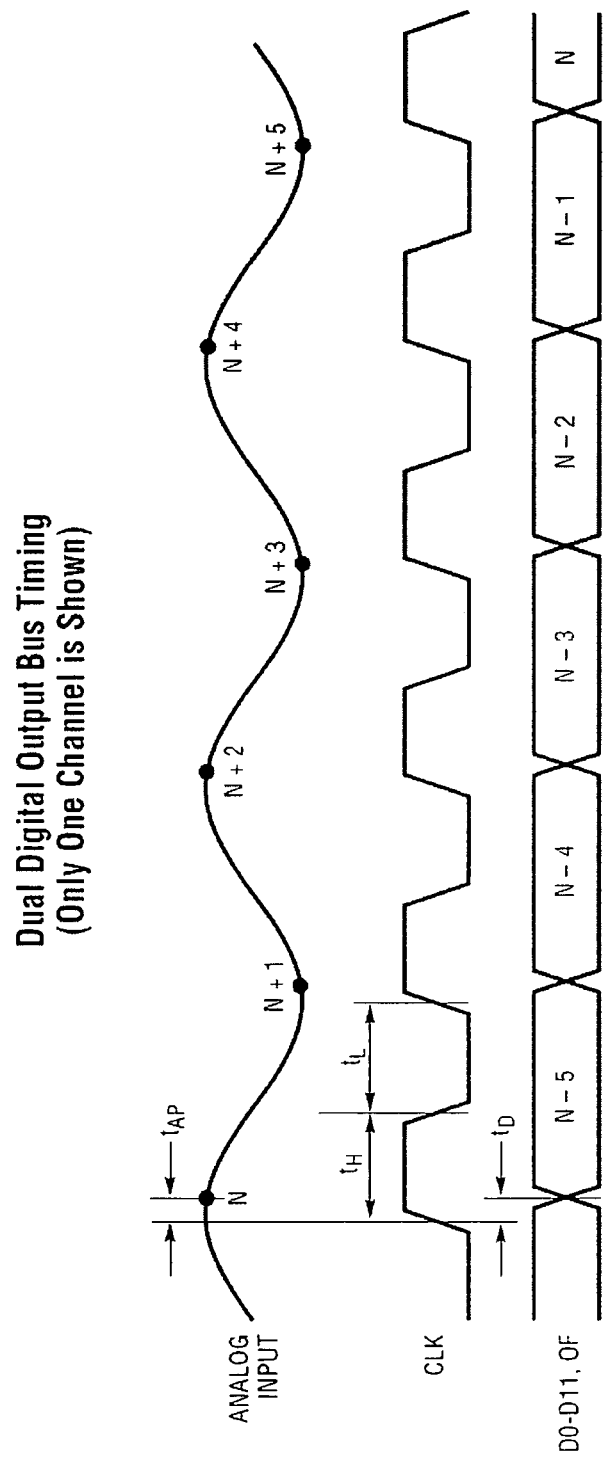
FIG. 6 is a schematic diagram of dual digital output bus timing, in accordance with an embodiment of the invention.
Figure 7:
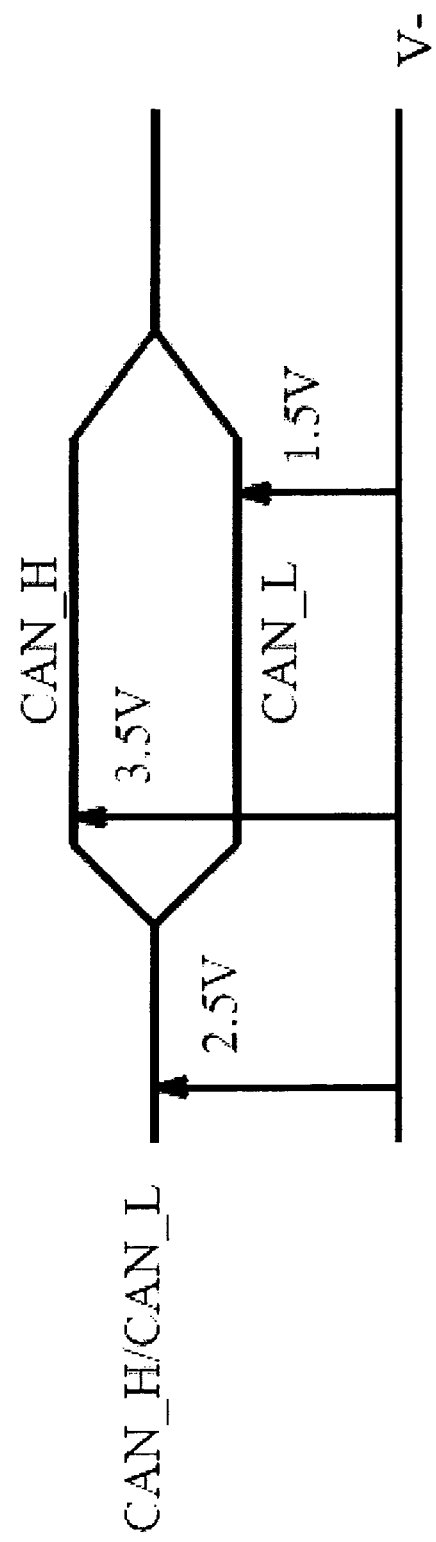
FIG. 7 is a schematic diagram of CAN High and CAN Low DeviceNet signals analyzed by the network diagnostic device, in accordance with an embodiment of the invention.

An example calculation to correct an ADC value of 866h follows:

With ADC=866h, Gain=810h, Offset=850h (not(ADC)*Gain)+Offset=Corrected value (not(866$h$)*810$h$)+850$h$=corrected value ($F32h$)+850$h$=1782$h$ FIG. 6 illustrates the outputs of the ADC 302 with respect to the ADC clock. The sample clock for this module is the inversion of the ADC clock 305 (FIG. 3). An embodiment of a signal level diagram for CAN High and CAN Low DeviceNet signals analyzed by the network diagnostic device 100 is shown in FIG. 7. As illustrated in FIG. 7, CAN High input signal is characterized by a Recessive Voltage of 2.5V, 0V differential from CAN Low and Dominant Voltage of 3.5V, 2V differential from CAN Low. Similarly, CAN Low signal is characterized by a Recessive Voltage of 2.5V, 0V differential from CAN High and a Dominant Voltage of 1.5V, 2V differential from CAN High. The voltage range for CAN High and CAN Low with respect to V— is −8V to +12V.

HL_CALIB Module

Referring again to FIG. 4, the HL_CALIB module 418 provides a calibration mode for the CAN High and CAN Low signals. This module receives an input of corrected CAN High and CAN Low signals from the HL_Correction module 400 and interfaces with the NIOS processor 308 and NIOS Control Registers 412. Upon receipt of a calibration "start" signal, the memory is filled with sampled data and an average value is calculated for calibration purposes.

PS_CORRECTION Module

The PS_Correction module 402 latches the ADC3 input values coming into the FPGA 306 on the CAN Power and Shield lines and uses an AC gain and DC offset values to normalize the incoming data (i.e., 0V on the CAN line is actually represented as 0V in ADC data). This takes into account the natural drift and tolerances in the response of the electronic components in front end detection circuits of the product and PCB traces. The gain and offset correction values come from the NIOS control registers module 412, which receives these values from calibration data sent to the NIOS processor 308 during boot. In order to allow calculations of purely unsigned values, the gain and offset values are defaulted to a predetermined hexadecimal value, which represents a real voltage of 0V from the power and shield signals. The FPGA firmware converts these values back to a signed voltage in its ADC conversion calculations.

To normalize the incoming ADC values, the PS_Correction module 402 latches, inverts (since the ADC 304 sends inverted values), multiplies by the gain correction factor, and adds an offset correction to the ADC values coming in at the 10 Mhz sampling rate. Since the power and shield values are multiplexed coming into the FPGA 306, the 100 Mhz clock signal of the ADC clock 305 is used to detect the "1" and "0" states of the 10 Mhz clock signal of the ADC clock 305. During the "1" state of the 10 Mhz clock signal, the shield data is latched and corrected. During the "0" state, the power data is latched and corrected.

Figure 8:
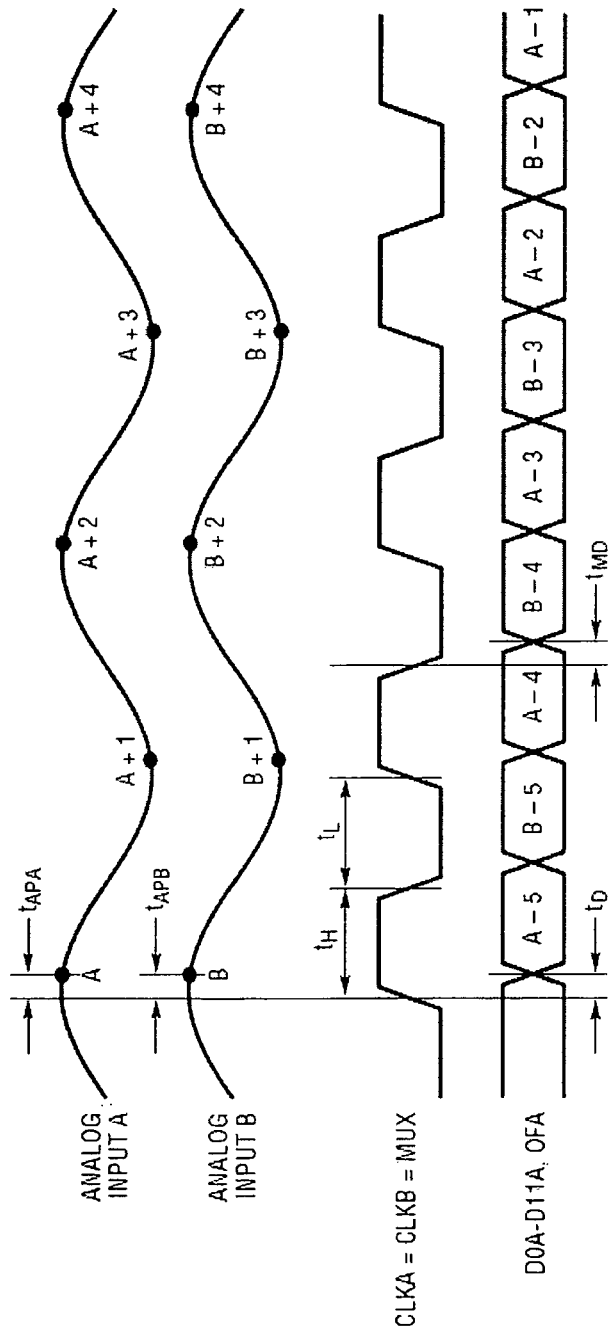
FIG. 8 is a schematic diagram of multiplexed digital output bus timing, in accordance with an embodiment of the invention.

In an embodiment, the CAN Power signal has a voltage range of 0V to +30V, while the CAN Shield signal has a voltage range of −15V to +5V. The PS_Correction module 402 accepts the output of ADC3 port 313 of the FPGA 306 (FIG. 3), which has 12 bit resolution. An embodiment of the output of the ADC3 port 313 with respect to the ADC clock is illustrated in FIG. 8. The sample clock for this module is the inverted ADC clock. The first analog input of the ADC 304 is connected to a CAN Power signal, while the second analog input of ADC 304 is connected to a CAN Shield signal. The sample rate of the ADC3 port 313 is lower than that of ADC1 port 309 and ADC2 port 311, since CAN Power and CAN Shield signal inputs to the ADC 304 are DC signals.

The output of the PS_Correction module 402 is connected to PS_CALC module 406 (bit-level waveform analysis of Power and Shield signals) and the PWSH_CALIB module 416. An example calculation to correct an ADC value of 866h is shown below:

With ADC=866h, Gain=810h, Offset=850h (not(ADC)*Gain)+Offset=Corrected value (not(866$h$)*810$h$)+850$h$=corrected value ($F32h$)+850$h$=1782$h$

PWSH_CALIB Module

The PWSH_CALIB module 416 operates on a 50 Mhz clock and provides a calibration mode for the power/shield signals. Upon receipt of a calibration "start" signal, the memory is filled with sample data, which becomes available to the NIOS CPU 308 for calibration purposes.

PS_CALC Module

The PS_CALC module 406 stores the power and shield signal samples from the PS_Correction module 402 and calculates corresponding average, minimum, maximum and RMSN waveform parameters, listed in Table 1 above, based on a predetermined number of samples (e.g., based on 128 samples). Once the average is calculated, this module generates an interrupt request to the NIOS microprocessor 308 to read the calculated values.

CAN Signal Integrator

The CAN signal integrator 414 generates a "can_rx" signal for the Can Core 307 and the HLD_CALC module 404.

Preferably, this module uses a 100 Mhz clock and accepts inputs from the HL_Correction module 400, the CANRX input pin of the FPGA 306, as well as a control input from the NIOS Control Registers 412. There are three outputs: "can_rx," "rx_change," and "rx_core."

In one embodiment, the "can_rx" signal is derived from two sources. The first source is the CAN RX signal 413 from an external CAN transceiver, which is fed to canrx_ext input of this module. The second source is CAN Differential input (d_i) 415 driven by HL_Correction module 400. The differential input is compared with hi_lim and lo_lim inputs to generate the "can_rx" signal using the following equation:

When $d\_i > hi\_lim$ then CAN RX="0" (dominant state)

When $d\_i < lo\_lim$ then CAN RX="1" (recessive state)

The "rx_core" output of the Can Signal Integrator 414 provides an unfiltered external CAN RX signal to CAN Core 307 if the CAN signal integrator 414 is configured to use an external CAN RX source. Otherwise, the CAN core 307 receives a filtered CAN RX signal.

The CAN signal integrator 414 provides an "rx_change" output for the HLD_CALC module 404 to indicate that a change in incoming bit levels of the CAN signal has occurred, which causes the HLD_CALC module 404 to perform bit-level waveform parameter calculations after each bit transition during the data and CRC section of a CAN frame. The output "rx_change" is a pulse which asserts when the CAN signal integrator 414 determines that a bit change has occurred. In an embodiment, this variable is calculated using an XOR gate logic. When "can_rx" changes, it is saved and used in the XOR equation the next time the CAN signal integrator 414 detects a change. Thus, the "rx_change" is equal to (saved can_rx) XOR (current can_rx). When there is no change in bit levels during the frame, rx_change will stay at "0." However, a change in bit levels (e.g., dominant to recessive) is detected by the XOR logic and the value of rx_change will be "1" for one clock cycle.

By writing to a control bit of the NIOS registers, the NIOS processor 308 selects to use either the FPGA-generated CAN RX signal 415 from CAN differential or the CAN RX signal 413 derived by an external CAN transceiver.

HLD_CALC Module

Figure 9:
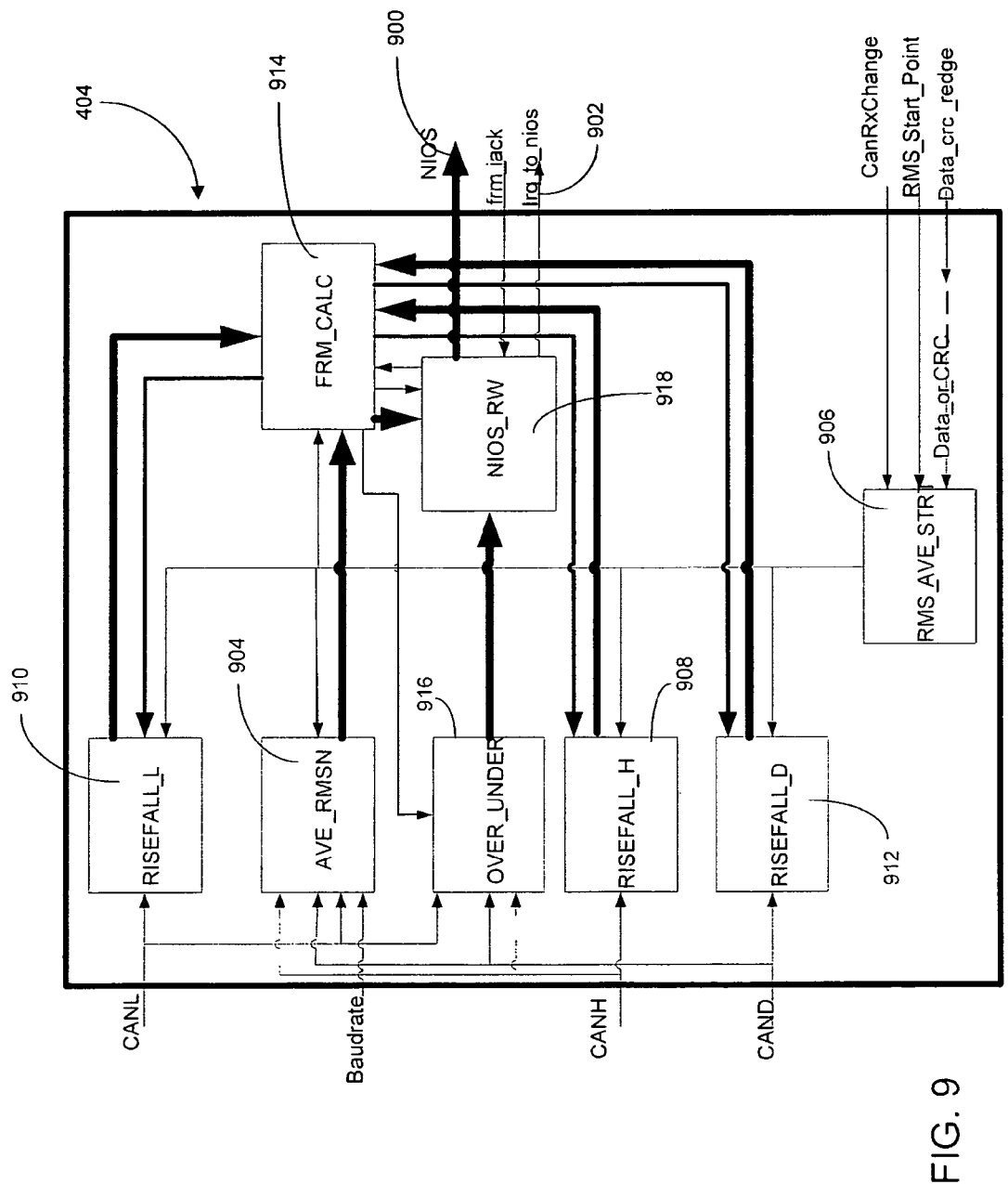
FIG. 9 is a schematic diagram of the HLD_Calc module of the FPGA, in accordance with an embodiment of the invention.

The HLD_Calc module 404 measures and calculates the bit-level waveform parameters for the CAN High, Low and Differential signals and stores the results in memory registers that are available to the NIOS microprocessor 308. The NIOS microprocessor 308 firmware, in turn, processes the network warning, error, and health index data via interrupts from the HLD_Calc module 404 and the embedded CAN Core 307 and stores this data in the shared RAM 310. Turning to FIG. 9, an embodiment of the HLD_Calc module 404 of the FPGA 306 is shown in more detail. Inputs to the HLD_Calc module 404 include the corrected ADC data for CAN High, Low and Differential signals, 50 MHz and 100 Mhz clocks, NIOS address, control signals from the NIOS control registers 412, CAN receive bit (from CAN Signal Integrator module 414), and a control signal (data_crc_redge) which is taken from the CAN core 307 that specifies when the CAN frame is in the data or CRC sections.

Preferably, the HLD_Calc module 404 performs the bit-level waveform parameter calculations after each bit transition during the data and CRC section of the CAN frame. If two or more bits of data come through at the same level during these sections of the CAN frame, then the average and RMS waveform parameters are calculated only for the first bit. The next set of calculations begin after the next bit transition (e.g., dominant to recessive or vice versa).

A 32 bit NIOS data bus 900 connects this module to the NIOS microprocessor 308. The HLD_Calc module 404 also relays NIOS interrupt request signals 902 to the NIOS processor 308 and NIOS Control Registers module 412. The interrupt to the NIOS processor 308 tells it that the start of the CAN frame has been reached. The NIOS processor 308 then acknowledges the interrupt. Calculations on the CAN frame continue and when done, the NIOS processor 308 receives another interrupt letting it know that the CAN frame has been processed and calculation results are ready. The NIOS processor 308 then reads the registers and acknowledges the interrupt, while the HLD_Calc module 404 continues to process the data.

Specifically, the HLD_Calc module 404 processes the signal from the CAN core 307 that determines if the CAN frame is in its data or CRC section and latches it on the 50 Mhz clock. The rising edge of this signal is used to send an interrupt to the NIOS processor 308 letting it know that the start of the frame has occurred. The NIOS processor 308 uses this information in its bandwidth calculations. Knowing whether the incoming CAN frame is in its data or CRC section is important since it tells the main state machines in the sub-modules to start performing calculations on the incoming data. The HLD_Calc module 404 also determines whether the current bit on the CAN lines is a dominant bit or a recessive bit. This information is needed in sub-modules of the HLD_CALC module 404 in order to process the signal data.

The AVE_RMSN sub-module 904 calculates the average voltage and average RMS noise from the sample data coming in on the CAN High and CAN Low lines. It runs off of the 100 Mhz clock. It also controls the writing and reading of the FPGA's internal RAM (HLD_RAM). The lower 14 bits of data in each memory location is the CAN Low signal data while the upper 14 bits contains the CAN High signal data. The FPGA internal RAM is used in the calculation of RMS noise by saving the sampled data while the average voltage is being calculated. Once the average is done being calculated, the HLD_RAM will then be read back, using the average to calculate the RMS error.

The AVE_RMSN sub-module 904 contains the main calculation state machine, which works on a bit level. That is, it calculates the average and RMS noise on each measured bit of CAN High, Low and Differential signals of a CAN frame. The average is calculated by adding the sample data as it comes into the FPGA and is stored into the internal FPGA RAM (HLD_RAM), while the RMS noise is calculated after the average calculation is done. The RMS is calculated by reading the data out of HLD_RAM.

Figure 9A:
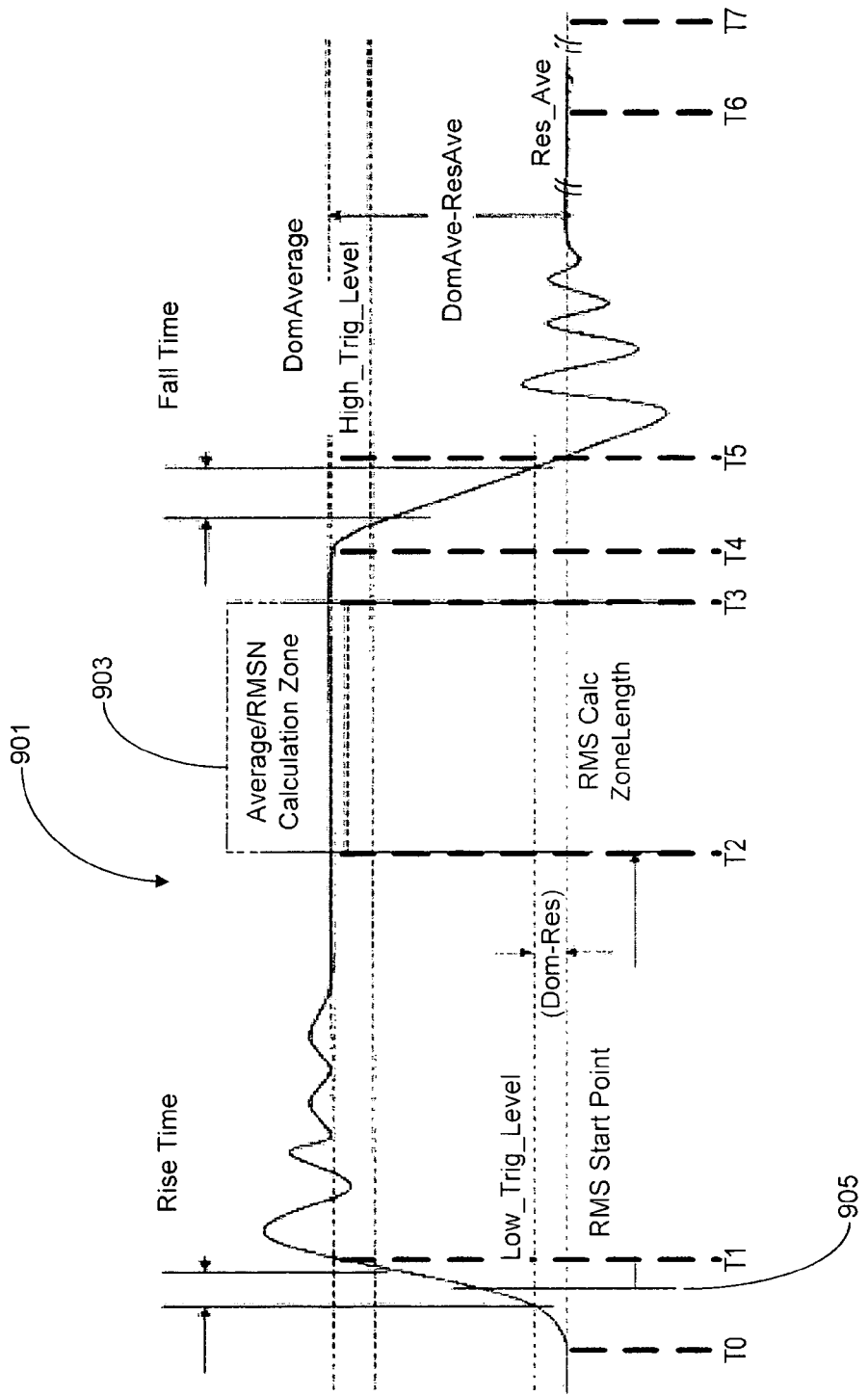
FIG. 9A is a schematic diagram of a CAN bit waveform analyzed by the network diagnostic device, in accordance with an embodiment of the invention.

As illustrated in FIG. 9A, a CAN bit waveform 901 represents one bit out of a network frame of data coming in on the CAN network. A CAN bit waveform 901 can be either dominant or recessive and will vary in duration depending on the baud rate. Preferably, the average values are calculated during the part 903 of the CAN bit which is most stable and where the CAN controller would sample its data to determine if the bit is recessive or dominant. The AVE_RMSN sub-module 904 counts down from the bit transition 905 of the CAN signal to the beginning of the section 903 in which to calculate the average voltages using a 100 Mhz clock. The bit transition is based on the CAN Differential signal. This sub-module also stores the values for CAN High and CAN Low signals into the HLD_RAM, which will then be used when calculating RMS noise.

Referring again to FIG. 9, in order to calculate the RMS noise present on the CAN High, Low and Differential signals, the AVE_RMSN sub-module 904 reads the internal FPGA RAM (HLD_RAM) that contains saved sampled signal data and calculates the difference from the average. This difference is then squared (multiplied by itself) to create the "squared error" and summed together. When a predetermined sample count maximum is reached, this sum is then averaged to arrive at the average RMS error for a particular bit.

To generate a start signal for average and RMS calculations, the RMS_AVE_STRT sub-module 906 generates a Start_Average_RMSN signal based on the CanRxChange and RMS_Start_Point inputs when the CAN frame is in its data/CRC portions 502, 504 (FIG. 5) (i.e., Data_CRC_frame indicator="1"). After CanRxChange="1", the value of RMS_Start_Point is loaded, a down-counter starts to count, and Start_Average_RMSN signal gets a value of "1" for two clocks after the down-counter is zero. This sub-module runs at 100 Mhz and the output is used by the following sub-modules as a start signal for average and RMS calculations: AVE_RMSN 904, RISEFALL_H 908, RISEFALL_L 910, RISEFALL_D 912, and FRM_CALC 914.

OVER_UNDER Sub-Module 916

This sub-module calculates the overshoot and undershoot voltages for the entire frame of data coming in. There are 3 processes which latch the data coming in from the ADC's for CAN High, Low and Differential on every clock. The data will then get used in the next process which calculates the minimum and maximum voltages on these signals. In the calculation process, at the beginning of a Data or CRC section 502, 504 of a CAN frame 500, the minimums and maximums are set to the first ADC value being sampled. During the rest of the data and CRC section, the maximums and minimums are calculated. The following equations are used:

If (Current_max<ADC latched value) then Current_max is assigned ADC latched value.

If (Current_min>ADC latched value) then Current_min is assigned ADC latched value.

The foregoing equations apply for all CAN High, Low and Differential signals. The outputs of the OVER_UNDER sub-module 916 are connected to the NIOS_RW sub-module 918. They become the full frame minimum and maximum values in the NIOS_RW register set. This sub-module runs on the 100 Mhz clock.

RISEFALL_H Sub-Module 908

This sub-module runs on the 100 Mhz clock and calculates the rise and fall times of the CAN H signal for each bit that is measured. In order to calculate the rise and fall times, two (2) edges of the CAN signals will be missed due to the fact that average voltages for dominant and recessive bits need to be calculated first. This sub-module also calculates the overshoot and undershoot voltages for the CAN High signal. The general method of calculating this information is by the sub-module 908 writing ADC sample data to memory until a bit transition has occurred, at which time, the memory is locked to prevent further writing. At that point, the memory is read backwards and the sample data read is used to determine the min/maxes, under/overshoots, as well as the rise and fall times. Preferably, the FPGA internal RAM is used within this sub-module to simplify the design.

A state machine implemented in the RISEFALL_H sub-module 908 performs the following functions:
1) Controlling access to the memory,
2) Generating valid signals for the rise time and fall time outputs, and
3) Controlling the counter for calculating the rise and fall times.

The state machine starts running when the CAN Core 307 indicates presence of the data or CRC parts 502, 504 of the CAN frame 500 and trigger levels are ready. This sub-module converts all mins and maxes to std_logic_vector and outputs them to the FRM_CALC sub-module 914. The trigger levels are calculated based on the averages. The trigger levels are used to determine when to start and stop calculating the rise and fall times. To calculate the trigger levels, a delta voltage is calculated first, which is preferably 12.5% of the CAN_H dominant minus recessive voltage. The high level trigger value is then calculated to be the dominant voltage minus this delta voltage while the low trigger level is the recessive voltage plus the delta voltage.

RISEFALL_L Sub-Module 910

This sub-module runs on the 100 Mhz clock and calculates the rise and fall times of the CAN L signal for each bit that is measured. In order to calculate the rise and fall times, two (2) edges are missed due to the fact that average voltages for dominant and recessive bits need to be calculated first. This sub-module also calculates the overshoot and undershoot voltages for the CAN Low signal. To perform the calculations, sub-module 910 writes ADC sample data to memory until a bit transition has occurred, at which time, the memory is locked to prevent further writing. At this point, the sub-module 910 reads the memory backwards and uses the read sample data to determine the under/overshoots and the rise and fall times.

A state machine is implemented for the following:
1) Controlling the access to the memory,
2) Generating valid signals for the rise time and fall time outputs, and
3) Controlling the counter for calculating the rise and fall times.

Preferably, the state machine starts running when CAN Core 307 indicates the data or CRC parts of a CAN frame, and the FRM_CALC sub-module 914 indicates that the trigger levels are ready. The trigger levels are calculated based on the averages in order to determine when to start and stop calculating the rise and fall times. To calculate the trigger levels, a delta voltage is calculated first, which is preferably 12.5% of the CAN_L recessive minus the dominant voltage. The high level trigger value is then calculated as the recessive voltage minus this delta voltage, while the low trigger level is the dominant voltage plus the delta voltage.

RISEFALL_D Sub-Module 912

This sub-module runs on the 100 Mhz clock and calculates the rise and fall times of the CAN D signal for each measured bit. In order to calculate the rise and fall times, two (2) edges are missed due to the fact that average voltages for dominant and recessive bits need to be calculated first. This sub-module also calculates the overshoot and undershoot voltages for the CAN Differential signal. The general method of calculating this information is by the sub-module writing ADC sample data to memory until a bit transition has occurred, at which time, the memory is locked to prevent further writing. At this point, the memory is read backwards and the sample data read is used to determine the min/maxes, under/overshoots and the rise and fall times.

A state machine is implemented for the following:
1) Controlling the access to the memory,
2) Generating valid signals for the rise time and fall time outputs,
3) Controlling the counter for calculating the rise and fall times.

The state machine starts running when the CAN Core 307 indicates the presence of data or CRC part of a CAN frame, and the FRM_CALC sub-module 914 indicates that the trigger levels are ready. The trigger levels are calculated based on the averages. These trigger levels are used to determine when to start and stop calculating the rise and fall times. To calculate the trigger levels, a delta voltage is calculated first, which is preferably 12.5% of the CAN D dominant minus recessive voltage. The high level trigger value is then calculated to be the dominant voltage minus the delta voltage, while the low trigger level is the recessive voltage plus the delta voltage.

FRM_CALC Sub-Module 914

This sub-module receives the bit-level data from AVE_RMSN, RISEFALL_H, RISEFALL_L, RISEFALL_D, and OVER_UNDER sub-modules 904, 908-912, 916 and translates and calculates data on a frame level. The FRM_CALC sub-module 914 receives the edge based calculations, stores them into the dominant or recessive branch, adds their values to the sums, increments counts and registers frame based values to the outputs after the frame ends. This sub-module also provides the last average output values used for trigger level calculations. This sub-module provides outputs for the values needed by the NIOS processor 308 at the end of a frame, except for final averages. Preferably, this sub-module provides the bit counts and sums, while the NIOS_RW sub-module 918 calculates the final averages. In an embodiment, this sub-module runs on the 50 Mhz clock. In order to cross the 100 Mhz domain into the 50 Mhz domain and guarantee that there are no timing issues, the pulses generated from the 100 Mhz domains are long enough (e.g., 2 or more clock cycles) to ensure that they can be used without issues in the 50 Mhz domain.

NIOS_RW Sub-Module 918

This sub-module receives the calculated data from the OVER_UNDER and FRM_CALC sub-modules 916, 914, calculates the averages for the sums, stores the calculations and passes them on to the NIOS microprocessor 308. It also generates an interrupt request signal to the NIOS processor 308. Preferably, this sub-module runs on the 50 Mhz clock.

As shown in Table 2 below, the FPGA 306 measures the average, minimum, and maximum values of multiple waveform parameters for each of CAN High, Low, and Differential signals in a CAN data frame:

TABLE 2

CAN Signal Specific Parameters

| CAN High, Low, or Differential Waveform Parameter | Measurements | Units |
|---|---|---|
| Dominant and Recessive Voltages | Avg, Min, Max | mV |
| Rise and Fall Times | Avg, Min, Max | ns |
| Overshoot and Undershoot Voltages | Avg, Min, Max | mV |
| RMS Noise at Dominant and Recessive Levels | Avg, Min, Max | mV |
| Common Mode Voltage | Avg, Min, Max | mV |

The FPGA 306 also generates warning and error flags for each of the above waveform parameters whenever they fall outside of a predetermined range.

Network Node Troubleshooting and Network Health Index

In connection with real-time bit-level waveform parameter monitoring described above, the network diagnostic device 100 compares these actual operating conditions to a set of threshold limits to determine network health and provide the user with enhanced network troubleshooting functionality. In one embodiment, the network health limits are defined by the DeviceNet specification. Alternatively or in addition, the network health limits may be defined by the user, for example at the remote monitoring system 106 (FIG. 1). To certify a DeviceNet network as being healthy, the network diagnostic device 100 characterizes the health of each DeviceNet connection node 103, 105, 107. Each DeviceNet node generates digital data on the bus and physically interconnects to all other nodes at all times, therefore each node can produce a failure source for the entire network. To certify good operating conditions for the network, the performance conditions of each node must be measured and verified. Since the number of performance parameters that need to be measured for each DeviceNet node is significant, thousands of measurements may need to be performed for a network having many nodes. Therefore, to provide varying levels of network analysis depth, the network diagnostic device 100 offers two modes of operation: (1) an Individual Measurement Mode, and (2) a Network Health Mode.

The Individual Measurement mode allows an advanced user to inspect a specific parameter measurement value for a specific node, source, or the overall network. The Network Health Mode, in turn, simplifies troubleshooting a DeviceNet installation by condensing the results of all measurements into a single overall network health status or index. The network health status is provided via a set of three values that represent the fault and warning health state for the Power/Shield, signal (i.e., CAN High, Low, Differential signals), and traffic measurement data. Hence, the network health status allows a user to immediately interpret the status of the entire network, even if its implementation architecture is complex. The network health status indicates whether (a) all network parameters are within the defined fault and warning threshold limits (i.e., the network is healthy), (b) one or more operating parameters exceed the defined warning threshold limits (i.e., the network is marginal, but operational), or (c) one or more critical parameters exceed the defined fault threshold limits (i.e., the network is unacceptable). When the user desires to analyze additional information, they can then obtain summary measurement information or drill down into individual measurement values as required.

Tables 3 and 4 below illustrate network traffic and CAN signal "health" data (i.e., warning and error/fault counts) calculated and relayed by the network diagnostic device 100.

TABLE 3

Traffic Health Data

| Traffic Parameter | Units | Description |
|---|---|---|
| Bandwidth usage | % | Present, Min, Max (including error frames/retries) |
| Message Rate | fps | Present, Min, Max |
| CAN Error To Msg Ratio | % | Present, Min, Max |
| CAN Error Rate | fps | Present, Min, Max |

TABLE 4

Health Data for CAN High, Low, and Differential (CAN H/CAN L) Signals

| Parameter | Warning and Error Description |
| --- | --- |
| Dominant V | Low/High Warning Count, Low/High Error Count |
| Recessive V | Low/High Warning Count, Low/High Error Count |
| Rise Time | Low/High Warning Count, Low/High Error Count |
| Fall Time | Low/High Warning Count, Low/High Error Count |
| Overshoot V | Low/High Warning Count, Low/High Error Count |
| Undershoot V | Low/High Warning Count, Low/High Error Count |
| Dom. RMS Noise V | Low/High Warning Count, Low/High Error Count |
| Rec. RMS Noise V | Low/High Warning Count, Low/High Error Count |
| Common Mode V | Low/High Warning Count, Low/High Error Count |
| Full Frame V | Low/High Warning Count, Low/High Error Count |

To determine when to generate parameter warnings and errors, the FPGA 306 stores predetermined high and low values corresponding to warning and error levels for the power, shield, as well as CAN High, Low, and Differential waveform parameters set forth in Tables 1, 2, and 4 above. In embodiments, the warning and error thresholds are initially set in accordance with the minimum acceptable requirements set forth in the DeviceNet standard. Preferably, in order to achieve the desired network health indicators, the warning and error thresholds are also adjustable by the user via the remote monitoring interface 106 in accordance with past network history. The NIOS microprocessor 308 evaluates high and low values corresponding to warning and error levels for each of the foregoing parameters to decide whether to increment the corresponding warning or error counter in a health table that is stored in the shared RAM 310. In one embodiment, the NIOS processor 308 updates the health table with warning and error counters for additional parameters, such as peak-to-peak power and shield voltage (Power p-p V and Shield p-p V), full frame voltages for CAN High, Low, and Differential signals (Full Frame V), as well as bandwidth usage percentage and other related metrics.

Figure 10:
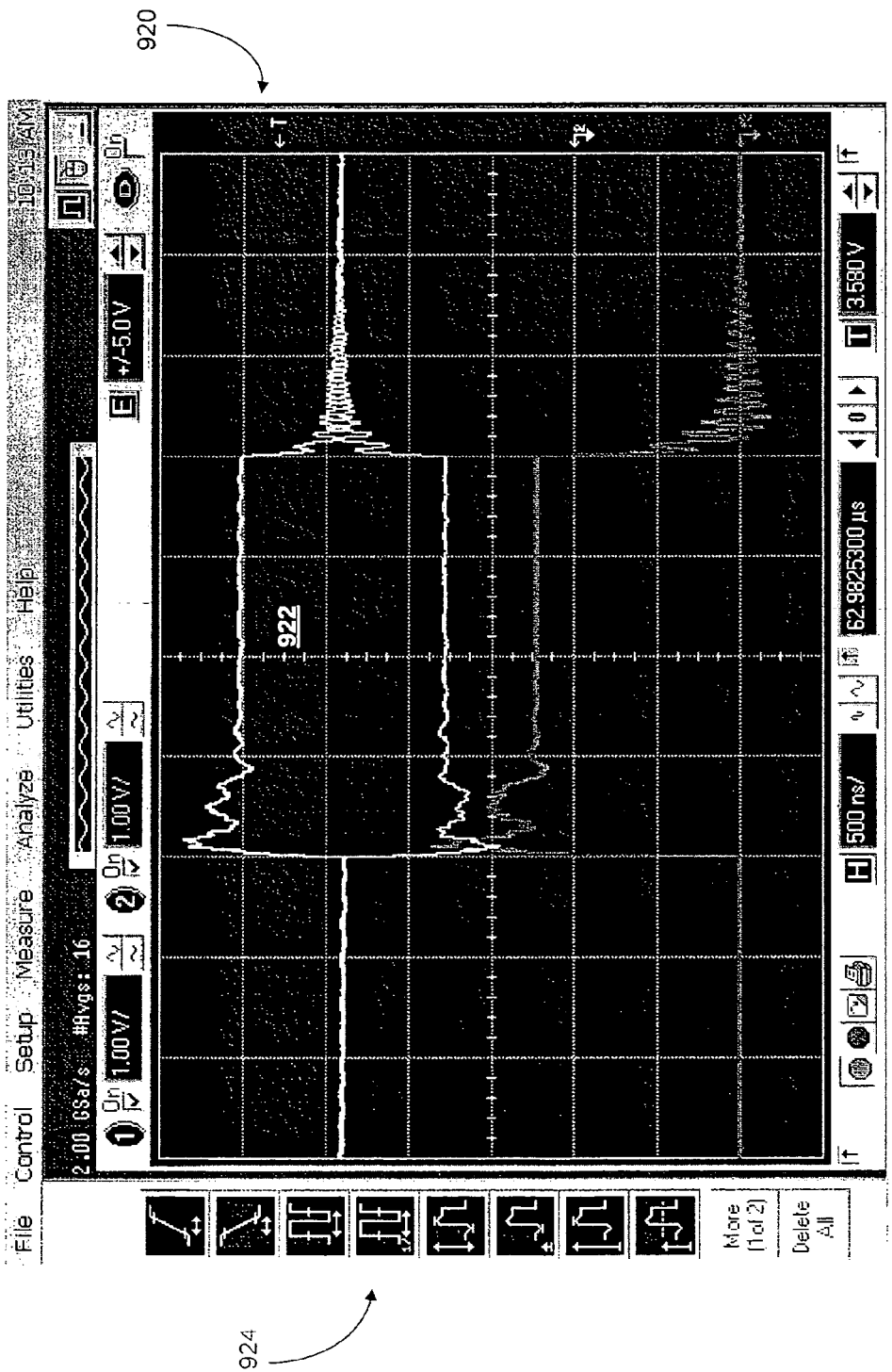
FIGS. 10-11 are diagrams of a user interface at the remote monitoring computer for presenting the user with a real-time display of a selected power, shield or CAN signal waveform, in accordance with an embodiment of the invention.
Figure 11:
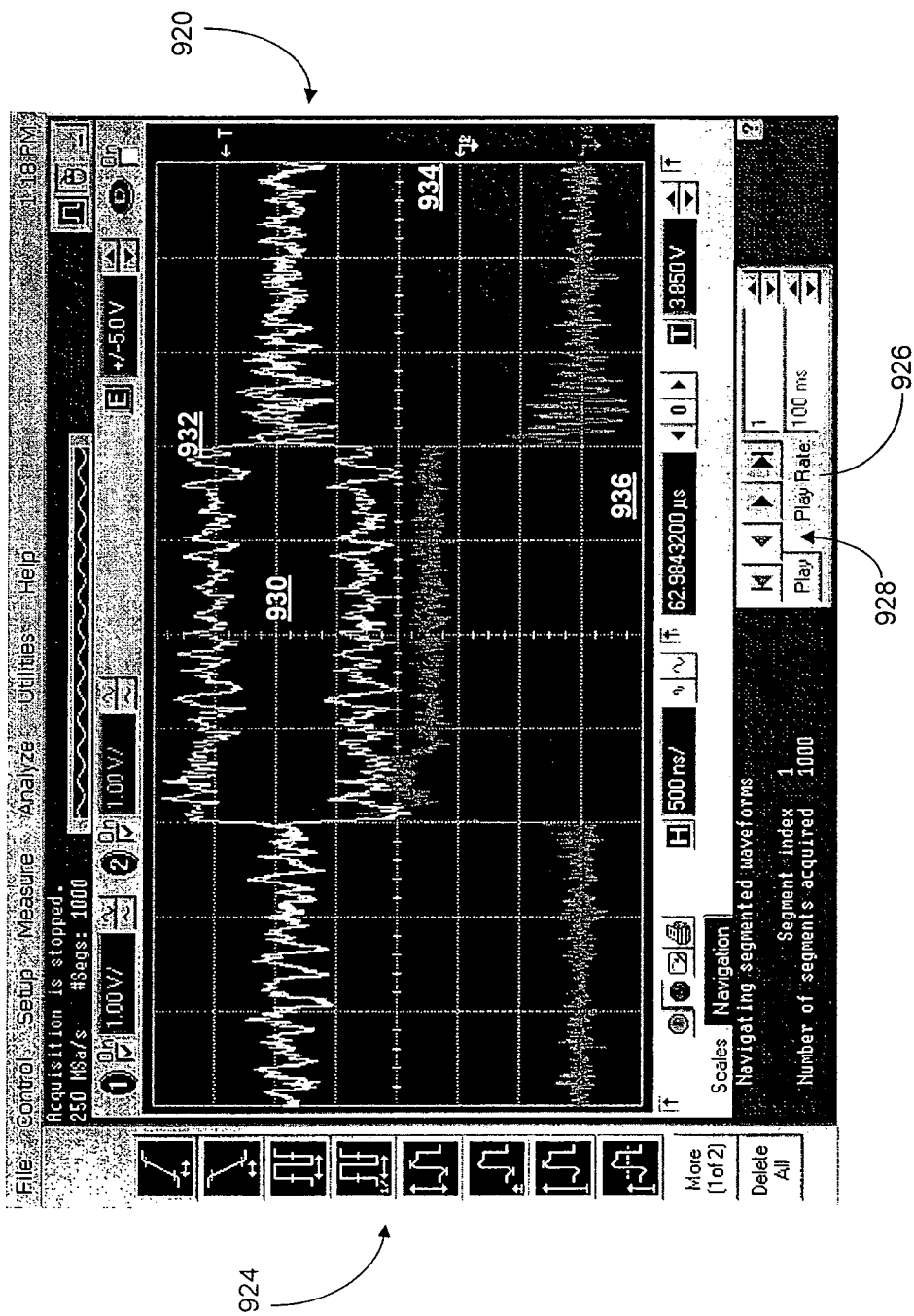

As discussed above, the ARM processor 312 accesses the shared RAM in order to relay, via an Ethernet compatible medium, the incoming digitized power, shield, CAN signal, as well as bit-level waveform parameter data and network health counters, to the remote monitoring computer 106 for display, long-term storage and further analysis. As illustrated in FIGS. 10-11, the high-speed sampling employed at the network diagnostic device 100 allows the monitoring computer 106 to present the user with a real-time signal display of incoming power, shield, and CAN signal data, thereby providing an oscilloscope-like display of incoming CAN waveform data. This also permits timely identification and prediction of failures by identifying marginal operating conditions on a network node, network segment, and overall network basis. As shown in FIG. 10, the monitoring computer 106 includes a user interface 920 which presents the user with a real-time display of a selected power, shield or CAN signal waveform 922. To select a particular waveform parameter for display and further analysis, the user interface 920 includes iconic representations 924 of bit-level waveform parameters of incoming power, shield, and CAN signal data, such as those listed in Tables 1 and 2 above.

Preferably, the user interface 920 includes a signal playback interface 926, shown in FIG. 11, for playback of time-recorded waveform data relayed by the network diagnostic device 100 over an Ethernet compatible medium to the remote monitoring computer 106. The remote monitoring computer 106, in turn, stores the incoming waveform data in a computer readable medium for further analysis. The signal playback interface 926 includes user controls 928 for playback, navigation, and referencing (e.g., indexing) of the recorded waveform signal 930. The signal playback interface 926 allows the user to quickly navigate to the desired part of the saved real-time waveform stream from the network diagnostic device 100 in order to locate parts of the signal stream that merit further analysis. As shown in FIG. 11, the selected signal segment shows a CAN signal bit 932 having presence of noise, as compared to a noise-free CAN signal bit of FIG. 10. By selecting particular icons 924 corresponding to bit-level waveform parameters of Tables 1 and 2 above, the user is presented with detailed bit-level analysis of selected waveform parameters. In one embodiment, in response to user selection of a particular waveform parameter, the user interface 920 automatically adjusts its time and/or signal amplitude scales 934, 936 and shifts the display toward the part of the bit 932 that corresponds to the selected waveform parameter.

Figure 12:
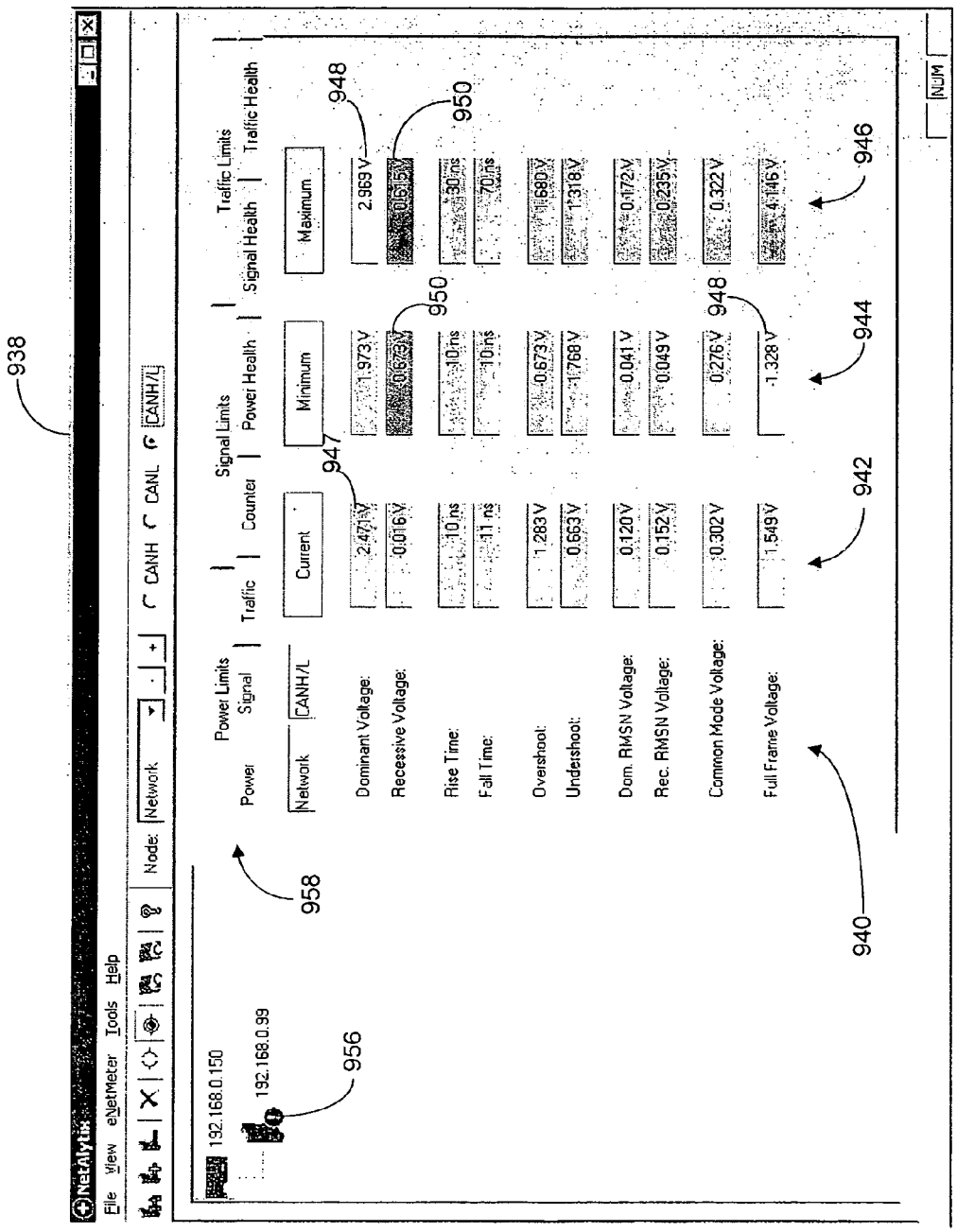
FIGS. 12-12A are diagrams of a CAN parameter interface of the remote monitoring computer, in accordance with an embodiment of the invention.

Turning to FIG. 12, an embodiment of CAN parameter interface 938 of the remote monitoring computer 106 is shown. The CAN parameter interface 938 provides a real-time display of CAN parameters discussed above in connection with Tables 1-4, including power, signal, and traffic health data. Specifically, in FIG. 12, the user has selected to view CAN Differential (CAN H/L) bit-level waveform parameters 940 discussed above in connection with Table 2. The parameter interface 938 displays current (i.e., real-time) parameter values 942, as well as corresponding maximum and minimum values 944, 946 for the analysis time period. Color-coded (e.g., highlighted in various colors) parameter values 942-946 provide the user with an at-a-glance analysis of the selected CAN parameter data for a particular network node or entire network segment that supplies incoming CAN data to the network diagnostic device 100. For instance, waveform parameters 947, highlighted in green, indicate that the incoming CAN data stream is within the normal operating range, while parameter values 948, 950, highlighted in yellow and red, respectively, indicate a network warning and network error levels of data for a particular CAN waveform parameter.

Figure 12A:
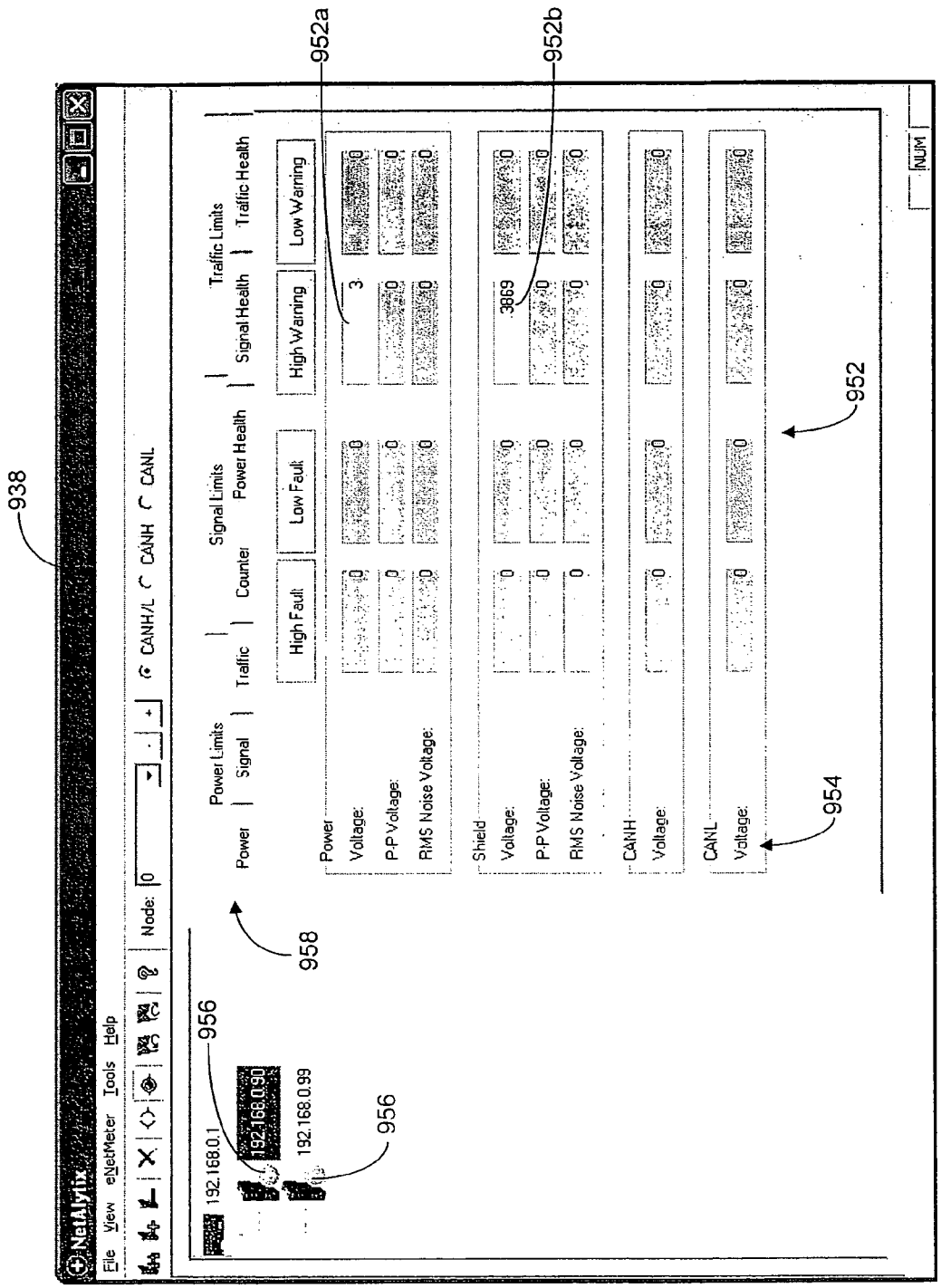

As illustrated in FIG. 12A, color-coded health counters 952 indicate error and warning counts for a given power, shield, CAN High, and CAN Low parameters 954. For instance, yellow health counters 952a, 952b indicate the count of warnings associated with a particular parameter, while any error counts are indicated in red. Absence of either error or warning counts for a particular parameter results in a corresponding health counter being shown in green and indicating a zero (0) count. A similar color-coded scheme is used to represent error and warning counts corresponding to signal and traffic health counters. A color-coded network health indicator 956 provides a user with an at-a-glance indication of whether a particular device 100 (and corresponding network segment) is registering any network errors or warnings, which may need further investigation by checking one or more tabs 958 of the CAN parameter interface 938. In particular, a green network health indicator 956 indicates a properly functioning network segment corresponding to a particular device 100, while yellow and red network health indicators 956 respectively indicate presence of warnings and errors.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for analyzing network signals, the method comprising:
    receiving, by a network diagnostic device, a plurality of measurements, wherein the plurality of measurements include measurements of line signal voltage waveforms corresponding to network nodes;
    analyzing the measured voltage waveforms so as to obtain a plurality of diagnostic parameters, wherein the plurality of diagnostic parameters include at least two of: a voltage rise time or fall time parameter, a voltage undershoot or overshoot parameter, a noise parameter, a common mode voltage parameter, a full frame voltage parameter, a dominant voltage parameter, or a recessive voltage parameter;
    comparing each diagnostic parameter to a corresponding set of thresholds; and
    based on the comparisons of diagnostic parameters to corresponding sets of thresholds, determining health statuses of the network nodes corresponding to the measured voltage waveforms.

2. The method of claim 1 further comprising collecting measurements over time to establish a network health index.

3. The method of claim 1, further comprising:
    condensing the results of the comparisons of diagnostic parameters to corresponding sets of thresholds into an overall network health status.

4. The method of claim 1, further comprising:
    communicating with a remote monitoring computer for remotely storing the plurality of diagnostic parameters and for notifying a user of the determined health statuses of network nodes.

5. The method of claim 4, wherein the network nodes are part of a Controller Area Network and the network diagnostic device communicates with the remote monitoring computer via an Ethernet port.

6. The method of claim 4, wherein the network nodes are part of a DeviceNet network and the network diagnostic device communicates with the remote monitoring computer via an Ethernet port.

7. The method of claim 4, wherein the network diagnostic device utilizes a first microprocessor to compare each diagnostic parameter to a corresponding set of thresholds, and a second microprocessor to communicate with the remote monitoring computer via an Ethernet port.

8. The method of claim 7 wherein the first microprocessor is implemented via a Field-Programmable Gate Array.

9. The method of claim 8 wherein the Field-Programmable Gate Array is adapted to emulate a NIOS microprocessor.

10. The method of claim 7 wherein the second microprocessor conforms to an ARM processor architecture.

11. The method of claim 7 wherein the first and second microprocessors exchange data via shared memory.

12. The method of claim 11 further comprising arbitrating access to the shared memory on a first-come-first-served basis.

13. The method of claim 1 further comprising sampling the network signals via at least one high-speed analog-to-digital converter.

14. A system for analyzing network signals, the system comprising:
    a network diagnostic device connected to a network via a first interface, the network diagnostic device being configured to:
        receive a plurality of measurements, wherein the plurality of measurements include measurements of line signal voltage waveforms corresponding to network nodes;
        analyze the measured voltage waveforms so as to obtain a plurality of diagnostic parameters, wherein the plurality of diagnostic parameters include at least two of: a voltage rise time or fall time parameter, a voltage undershoot or overshoot parameter, a noise parameter, a common mode voltage parameter, a full frame voltage parameter, a dominant voltage parameter, or a recessive voltage parameter;
        compare each diagnostic parameter to a corresponding set of thresholds; and
        based on comparisons of diagnostic parameters to corresponding sets of thresholds, determine health statuses of the network nodes corresponding to the measured voltage waveforms; and
    a remote monitoring computer, connected to the network diagnostic device via a second interface, the remote monitoring computer being configured to:
        receive the determined health statuses of the network nodes from the network diagnostic device.

15. The system of claim 14, wherein the network is one of a Controller Area Network and a DeviceNet network, and the first interface is a Controller Area Network interface.

16. The system of claim 14, wherein the network is one of a Controller Area Network and a DeviceNet network, and the second interface is an Ethernet-based interface.

17. The system of claim 14, wherein the network diagnostic device is further configured to:
condense the results of the comparisons of diagnostic parameters to corresponding sets of thresholds into an overall network health status; and
collect measurements over time to establish a network health index.

18. The system of claim 14, wherein the remote monitoring computer is further configured to:
store the plurality of diagnostic parameters; and
notify a user of the determined health statuses of network nodes.

19. The system of claim 14, wherein the network diagnostic device further comprises a first microprocessor and a second microprocessor, the first microprocessor being utilized for the comparison of each diagnostic parameter to a corresponding set of thresholds, and the second microprocessor being utilized for communicating with the remote monitoring computer via an Ethernet port.

20. The system of claim 19 wherein the first microprocessor is implemented via a Field-Programmable Gate Array.

21. The system of claim 20 wherein the Field-Programmable Gate Array is adapted to emulate a NIOS microprocessor.

22. The system of claim 19 wherein the second microprocessor conforms to an ARM processor architecture.

23. The system of claim 19 wherein the first and second microprocessors are configured to exchange data via shared memory.

24. The system of claim 23 wherein the network diagnostic device further comprises a shared memory controller for arbitrating access to the shared memory on a first-come-first-served basis.

25. The system of claim 14 wherein the network diagnostic device further comprises at least one high-speed analog-to-digital converter for sampling network signals.

26. A network diagnostic device for analyzing network signals originating from a network node, the network diagnostic device comprising:
a first interface connected to a network for receiving a plurality of measurements from the network, wherein the plurality of measurements include measurements of line signal voltage waveforms corresponding to network nodes;
one or more processors, configured to:
analyze the measured voltage waveforms so as to obtain a plurality of diagnostic parameters, wherein the plurality of diagnostic parameters include at least two of: a voltage rise time or fall time parameter, a voltage undershoot or overshoot parameter, a noise parameter, a common mode voltage parameter, a full frame voltage parameter, a dominant voltage parameter, or a recessive voltage parameter;
compare each diagnostic parameter to a corresponding set of thresholds; and
based on comparisons of diagnostic parameters to corresponding sets of thresholds, determine health statuses of the network nodes corresponding to the measured voltage waveforms; and
a second interface, connected to a remote monitoring computer, for communicating the determined health statuses of the network nodes to the remote monitoring computer.

27. The network diagnostic device of claim 26, wherein the network is one of a Controller Area Network and a DeviceNet network, and the first interface is a Controller Area Network interface.

28. The network diagnostic device of claim 26, wherein the network is one of a Controller Area Network and a DeviceNet network, and the second interface is an Ethernet-based interface.

29. The network diagnostic device of claim 26, wherein the one or more processors are further configured to:
condense the results of the comparisons of diagnostic parameters to corresponding sets of thresholds into an overall network health status; and
collect measurements over time to establish a network health index.

30. The network diagnostic device of claim 26, wherein the one or more processors includes a first microprocessor that is a NIOS microprocessor emulated in a Field-Programmable Gate Array.

31. The network diagnostic device of claim 26, wherein the one or more processors includes a second microprocessor that conforms to an ARM processor architecture.

32. The network diagnostic device of claim 26 wherein the first and second microprocessors are configured to exchange data via shared memory.

33. The network diagnostic device of claim 32 further comprising a shared memory controller for arbitrating access to the shared memory on a first-come-first-served basis.

34. The network diagnostic device of claim 26 further comprising at least one high-speed analog-to-digital converter for sampling network signals.

35. The method of claim 1, wherein the network nodes are part of a controller area network (CAN), and the line signal voltage waveforms include CAN High (CAN_H), CAN Low (CAN_L), CAN Power, and CAN Shield signals, and the diagnostic parameters are based on one or more of the CAN_H, CAN_L, CAN Power, and CAN Shield signals.

36. The system of claim 14, wherein the network nodes are part of a controller area network (CAN), and the line signal voltage waveforms include CAN High (CAN_H), CAN Low (CAN_L), CAN Power, and CAN Shield signals, and the diagnostic parameters are based on one or more of the CAN_H, CAN_L, CAN Power, and CAN Shield signals.

37. The network diagnostic device of claim 26, wherein the network nodes are part of a controller area network (CAN), and the line signal voltage waveforms include CAN High (CAN_H), CAN Low (CAN_L), CAN Power, and CAN Shield signals, and the diagnostic parameters are based on one or more of the CAN_H, CAN_L, CAN Power, and CAN Shield signals.

* * * * *